United States Patent [19]

Gamache

[11] Patent Number: 5,170,757
[45] Date of Patent: Dec. 15, 1992

[54] VARIABLE HORSEPOWER OUTPUT GEARING FOR PISTON ENGINE

[76] Inventor: Damien Gamache, 275 Désilets, Laval, Quebec, Canada, H7N 5B9

[21] Appl. No.: 812,999

[22] Filed: Dec. 24, 1991

[51] Int. Cl.$^5$ ............................................. F16H 21/30
[52] U.S. Cl. ................................................ 123/197.4
[58] Field of Search ........................... 123/197.1, 197.4

[56] References Cited

U.S. PATENT DOCUMENTS

| | | |
|---|---|---|
| 1,191,827 | 7/1916 | Reese . |
| 1,873,908 | 8/1932 | Schinke . |
| 2,088,332 | 7/1937 | Marchou . |
| 2,933,940 | 4/1960 | Hallden . |
| 2,957,363 | 10/1960 | Ingham . |
| 3,301,244 | 1/1967 | Renshaw ................... 123/197.1 |
| 3,424,021 | 1/1969 | Freudenstein . |
| 3,626,786 | 12/1971 | Kinoshita . |
| 3,861,239 | 1/1975 | McWhorter ................... 123/197.4 |
| 4,026,252 | 5/1977 | Wrin ................... 123/197.1 |
| 4,073,196 | 2/1978 | Dell ................... 123/197.1 |
| 4,211,190 | 7/1980 | Indech ................... 123/48 B |
| 4,437,438 | 3/1984 | Mederer ................... 123/48 B |
| 4,887,560 | 12/1989 | Heniges ................... 123/197.4 |
| 4,970,995 | 11/1990 | Parsons ................... 123/197.1 |
| 5,067,456 | 11/1991 | Beachley et al. ................... 123/197.4 |

FOREIGN PATENT DOCUMENTS

88/08095 10/1988 PCT Int'l Appl. ............. 123/197.4

OTHER PUBLICATIONS

"VR/LE Engine with a Variable R/L during a Single Cycle" by T. J. Rychter and A. Teodorczyk—Society of Automotive Engineers 850206, 1986.
"Economy and NO Emission Potential of an SI Variable R/L Engine" by T. J. Rychter and A. Teodorczyk—Society of Automotive Engineers 850207, 1986.

Primary Examiner—David A. Okonsky
Attorney, Agent, or Firm—Robic

[57] ABSTRACT

A piston engine has at least one cylinder and one piston, a crankshaft and gearing apparatus that has a set of two or more traveling gears fixed together which are rotating on a crank that belongs to: 1) either the crankshaft itself, 2) either an extended part of the crankshaft, or 3) to an auxiliary shaft which is geared to the said crankshaft. One of the traveling gears is of irregular design and travels in a periodical way against a non-rotating internally toothed ring. The second traveling gear is of regular form and meshes with a rotating output ring, which in turn drives an output shaft which can be used as an output instead of the regular crankshaft and provides an alternate non regular pattern of piston displacement relative to output shaft rotation. The gearing apparatus provides a volume expansion rate in the cylinder which is conducive to efficient combustion.

19 Claims, 18 Drawing Sheets

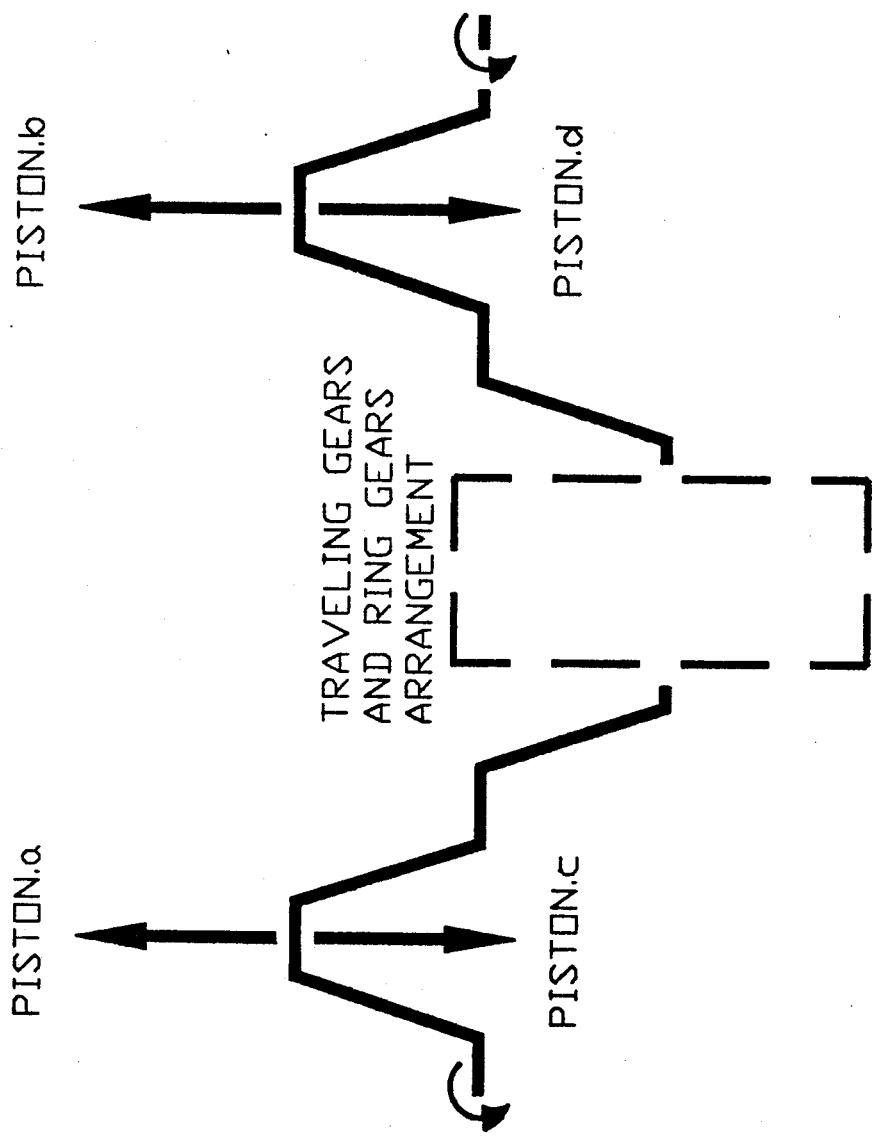

VARIABLE HORSEPOWER OUTPUT GEARING FOR PISTON ENGINE

FIELD OF THE INVENTION

This invention relates a gearing apparatus for use with a piston engine. The invention relates further to an apparatus for providing a variation in a relation between an angular velocity of the crank shaft and an angular velocity of the output shaft of the engine during the power stroke phase to provide a rate of volume expansion in the engine's cylinders which is conducive to efficient combustion.

BACKGROUND OF THE INVENTION

Most vehicles are powered by reciprocating piston engines and must face widely varying load conditions such as quick accelerations, highway cruising, city traffic and idling. As a rule, vehicle engines are sized in relation to the most demanding requirements, namely acceleration and climbs, which represent less than 5% of the engine usage. At other than these precited operating conditions, say a 100 horsepower engine could well be replaced with a 50 or even a 25 horsepower engine, the efficiency of which would be far greater than that of an oversized 100 horsepower engine. It will be even more interesting if the 100 horsepower engine could be turned out as a 10 Hp machine during idling. The range of horsepower requirements similar to the ones mentioned above have been arrived at after extensive studies and produced as standards, one of these being the Los Angeles "LA-4 Synthetic driving cycle" and another one being the "Pittsburg Cycle".

The fact is that engines are efficient when producing their desing horsepower with piston speeds close to 1000 feet per minute, maximum efficiency occurs at close to these piston speeds at approximately 80% maximum capacity. These operating criteria are related to thermodynamics. The use of gearboxes merely serves the purpose of adapting the engine to low speed loads by making the engine run faster, thus producing many more useless reciprocating movements. Hence, outside ideal operating conditions, the machine performance and efficiencies deteriorate, specially at reduced speed whereas combustion is poor; this applies very much to spark ignition engines and also, to a lesser extent, to the diesel engines.

A few patents embodying means to vary piston speed have been proposed, as in Reese U.S. Pat. No. 1,191,827 and Renshaw U.S. Pat. No. 3,301,244, but the models of the abovementioned patents show high friction losses and require extensive construction without possible speed evenness. Variable stroke engines have been proposed to improve engine performance, and other mechanisms have been proposed in order to change the waveshape of the piston travel time as in Indech U.S. Pat. No. 4,211,190 and in Schinke U.S. Pat. No. 1,873,908 and in Mederer U.S. Pat. No. 4,437,438, but no efficient device has been proposed to eliminate some of the useless piston travels when an engine is running at low power requirements. Moreover, when comparing to the present invention, no such arrangement of readily available multi-horsepower capacity through optional variation of piston movement has been shown in any of the precited Patents documents and the I.C. engine with conventional piston/crankshaft arrangement is still the prevailing prime mover around.

SUMMARY OF THE INVENTION

The present invention is aimed at using each power stroke of a conventional engine at maximum efficiency.

The invention provides a variable horsepower output gearing apparatus for use with a piston engine having an output shaft and at least one piston each connected by a connecting rod to a crank or crankpin. The apparatus comprises irregular gear means connected between the crank shaft associated with each at least one piston and the output shaft for varying a relationship between an angular velocity of the crank shaft and an angular velocity of the output shaft, the relationship between the angular velocity of the crank shaft during a power stroke phase of the piston's cycle and the output shaft being such that a rate of volume expansion of a cylinder associated with the piston is conducive to efficient combustion in the volume. The irregular gear means provide at least two power output connections between the crank associated with each at least one piston and the output shaft, the power output connections having different relationships, and the apparatus further comprises gear switching means for selecting one of the at least two power output connections. In this way, by selecting the power output connection, the relationship can be selected to best suit the desired horsepower output of the engine.

The invention also provides a variable horsepower output gearing apparatus for use with a piston engine having an output shaft and at least one piston each connected by a connecting rod to a crank or crankpin. The apparatus comprises irregular gear means connected between the crank shaft associated with each at least one piston and the output shaft for varying a relationship between an angular velocity of the crank shaft and an angular velocity of the output shaft, the relationship between the angular velocity of the crank shaft during a power stroke phase of the piston's cycle and the output shaft being such that a rate of volume expansion of a cylinder associated with the piston is conducive to efficient combustion in the volume. The irregular gear means comprise an irregular travelling gear rotatably mounted on a crank lever connected to the crank shaft, the irregular travelling gear being meshed with a complementary stationary ring gear, and a regular travelling gear coupled to the irregular travelling gear and meshed with a regular ring gear, the regular ring gear being coupled to the output shaft.

According to a preferred feature of the invention, there is provided through the use of the regular and irregular gears travelling within the toothed rings a very simple and sturdy mechanism to achieve a piston engine with an adjustable retarded piston movement at the bottom of the power stroke or during the other strokes, while producing a fast piston drop during most of the power stroke. This will eliminate many useless piston movements for the engine running at reduced load.

The number of reduced power modes available on the same engine can be made 1, 2 or more. The supplementary reduced horsepower modes can be made available through the addition of regular traveling gears of diverse sizes with respective toothed rings. The examples shown below indicate typical values for reduced horsepower capacities at 50% and 25% of maximum rating, with idling at 12%, but the application would adapt equally well to ratios above or below these values. While the 25% power mode can be used for low speed urban traffic, the 12% or so horsepower values look very interesting for a machine running at idle for long time periods. In this case, engine wear, fuel consumption and pollutant emissions will be drastically reduced and this would make it a very attractive application for an emergency standby generator of instant availability, on which a clutch can be adapted to minimize inertia losses on the driven equipment. On a broader sense, any type of rotating equipment of which the horsepower requirements are variable can be advantageously driven by this new engine.

The gear works can be tailored so that the expansion rate of the combustion chamber is better adapted to the thermodynamics of either the Diesel or the Otto cycle. Through the angular positioning of the stationary toothed ring, the piston movement can be slowed down on diverse positions of the piston during its power stroke when the engine is running in reduced power capacity, hence the ability to modulate the effective expansion ratio of the engine and its horsepower rating. Each power stroke can thus be optimized for maximum efficiency. Said angular positioning can also be used to slow down the piston movement at the top of the power stroke, so as to better use some fuels of low ignition characteristics, such as natural gas.

The control of the power mode selection and of the effective expansion ratio can be done manually or automatically on the run. The use of a microprocessor can be put to advantage to control the horsepower mode, the effective expansion ratio as well as the transmission on a vehicle equipped with the engine proposed herein.

This invention is equally well suited to single or multipiston engines, two stroke or four stroke, injection or carburetted type, diesel or explosion, with any type of fuel, turbocharged or not.

When compared to a conventional engine, the timing of the operation of the valves will not be changed relative to the piston height, this timing being related to the crankshaft position, which is very little affected by the reduced power mode. However, by connecting the valve operating camshaft with the reduced power shaft, it is possible to optimize the timing of any of the valves in cooperation with other relevant variables. For example, valve timing can be adjusted in coordination with effective expansion volume for ideal volumetric efficiency and to minimize pumping losses.

Because the conventional piston engine is made to run at low speeds when delivering low or very low horsepower, such a conventional engine needs many piston to even out the resulting sluggish operation. It is not the case with this new engine of which the power stroke makes it perform positively like a high speed engine most of the time. Because of this much improved operation in the lower power range, the need for engines with more than 4 cylinders is not likely to be required.

The added complexity of the engine gear system is partly compensated by the lower number of pistons. The overall size and weight of the new engine may be larger than on conventional engines, but the benefits will become clear if there is significant machine usage under variable loads.

A wide range of reduced horsepower values is possible by merely changing by a very small amount the diameter of the regularly shaped gears. The addition of various traveling gears with matching toothed rings, within the same engine, will procure diverse reduced horsepower modes.

The proposed gear arrangements hereabove make optimal use of materials, namely an important part of the gear travel is being used during the densest part of the power stroke. Moreover, this highly loaded part of the irregular gear is of regular shape, hence it can be machined or reinforced by means of conventional gear tooling.

The recurrence of the movement of the irregular traveling gear requires that this gear travels inside the toothed ring in a periodical way. In the descriptions below, a non regular toothed ring has a circumference which is twice the circumference of the traveling gear that travels in it, thus the period is 2. This period of 2 is preferred, but periods of 3, 4, or more can be used.

Except for the irregular traveling gear and the matching irregular toothed ring, no special components are required. Both these gears need to be of adequate strength towards piston forces and crankshaft accelerations. These two irregular gears are key elements in this engine, the fabrication of which requires the appropriate skills and the equipment suitable for irregular gear cutting. These equipment are now available as a result of the recent updates in machine tool technology. Also proper gear finishing and surface treatment can significantly improve the gear resistance to wear. Still further, these two gears should be easily fabricated in large quantities once adequate gear teeth desing and machine setup have been achieved.

Because of the variable speed relationship between the crankshaft and the output shaft, some crankshaft oscillation will occur while the engine is running in a reduced horsepower mode, hence there is a need for a sturdy lightweight construction for the crankshaft and the traveling gears assembly. In this respect, the much reduced speed of the crankshaft assembly at diverse positions of the piston reduces the stress and wear on all of the engine components. As an option, speed variations of the crankshaft assembly can be optimized with the addition of some gear works, as explained below.

Whenever the engine is used in a reduced power mode without using inertial masses for speed evenness, the inertia of the load must prevail over the inertia of the crankshaft assembly, so that the alternate output shaft rotation keeps almost steady and accordingly dictates the piston position versus the time.

Other advantages to be accounted for by the usage of this invention will be gained through the reduced speed of the engine components when in the reduced power mode, of which low engine wear and small cranking effort for starting.

BRIEF DESCRIPTION OF THE DRAWINGS

The general advantages of this invention will become more clear as a result of the following detailed description of the preferred embodiments with reference to the appended drawings, in which:

FIG. 11 is an outline of a multi-cylinder engine embodying the invention.

FIG. 12f is an optional arrangement for FIG. 12a.

The following

FIG. 13 is a set of curves relating piston height to shaft rotation under different power modes.

FIG. 14 thru FIG. 17 are four sets of curves relating piston height to time periods under different power modes, with variable positions of the same gear arrangement.

FIG. 18 is a set of curves relating piston height to time periods of a traveling gear arrangement using a crankshaft gear reducer.

FIG. 19 is a set of curves relating piston height to shaft angle under different power modes with the mutilated gear arrangement.

FIG. 20 thru FIG. 22 are three sets of curves relating piston height and time periods under different power modes, with irregular gear and offsetting sleeve at different angular shifts.

FIG. 23 is a set of curves relating piston height to shaft angle under different power modes which are approximate of the Otto cycle.

DETAILED DESCRIPTION OF THE PREFERRED EMBODIMENTS

Figure 1:
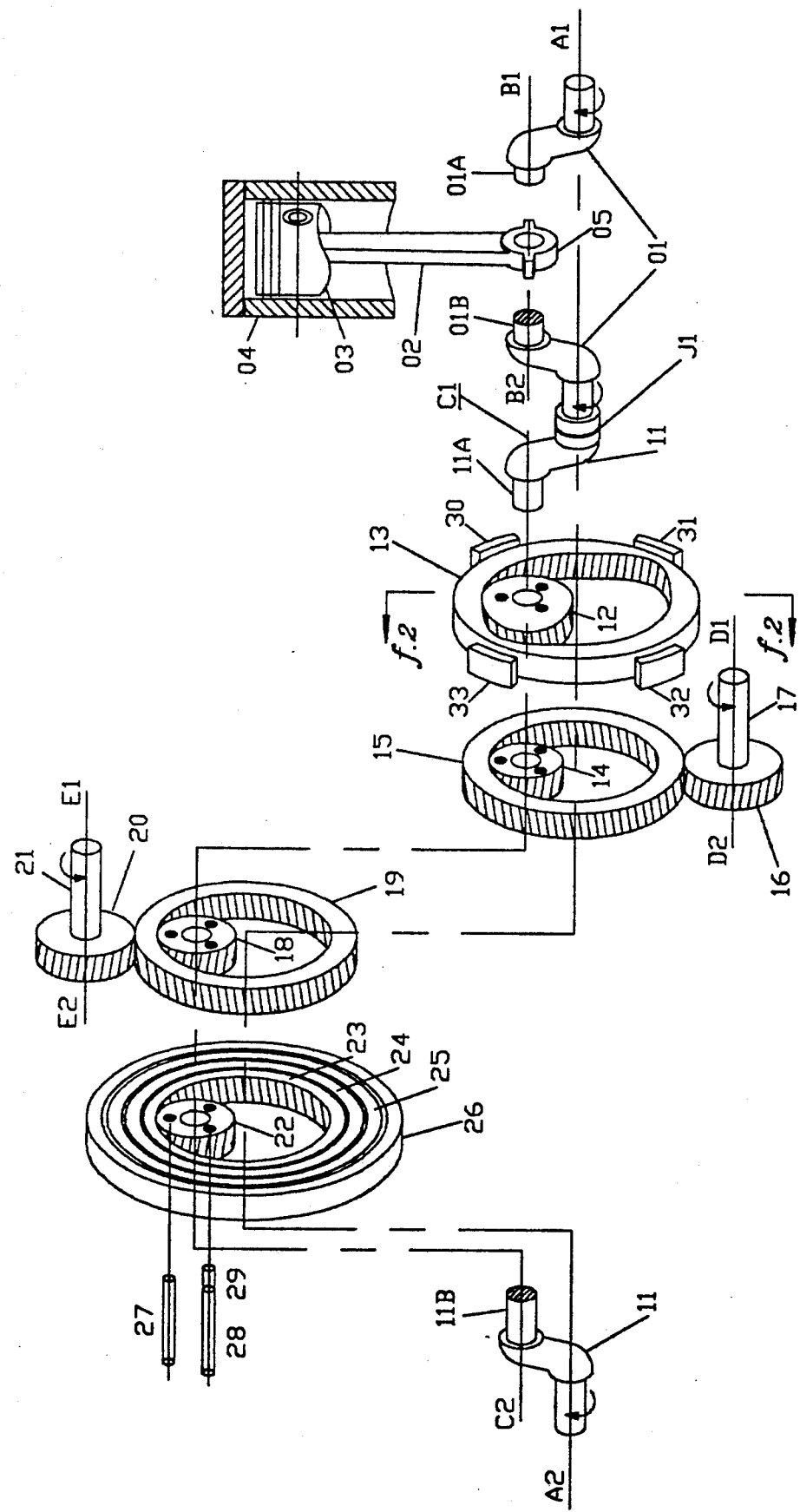
FIG. 1 is an exploded view of the piston, cylinder, crankshafts and gear arrangement of a piston engine embodying the invention with two reduced horsepower modes and speed regulating mass rings.

In FIG. 1 is seen a cylinder 04 in which piston 03 travels up and down. The piston 03 is attached to connecting rod 02. The connecting rod 02 is attached with bearing part 05 in a rotatable way to the crankpins 01A and 01B of crankshaft 01. Crankshaft 01 is rigidly attached to crankshaft 11 at the junction J1 with the angular position of crankpin 01A-01B in a similar angular position as crankpin 11A-11B, and the assembly of crankshafts is free to rotate on axes A1-A2. Crankshafts are shown schematically without counterweights, without bearings and without supports. Gear 12 is an irregular gear, free to rotate on crankpins assembly 11A-11B, axis B1-B2, it is in contact with internally toothed ring 13 and is attached on the rear side to gear 14, gear 18 and gear 22 by means of pins 27, 28 and 29. Gears 14, 18 and 22 are of circular shape and are also free to rotate on crankpins 11A-11B, axis B1-B2. The radius of gear 14 is different from the radius of gear 18. Also the radius of gear 22 is closer to the radius of gear 12 than any of the gears 14 or 18.

Gear 13 is an internally toothed ring centered on axes A1-A2 and accurately shaped for proper traveling of gear 12 in a periodical rotation inside it. Gear 13 is shown schematically without supports and is rotatably adjustable by stationary blocks 30, 31, 32, 33 which are part of an angular adjusting mechanism which is not detailed here.

Gear 15 is an internally toothed ring of constant radius centered on axes A1-A2 the inside part of which meshes with gear 14. Gear 15 is shown schematically without supports and can rotate on axis A1-A2. The outside surface of gear 15 is also toothed and meshes with gear 16 which is fixed to output shaft 17. Gear 16 and output shaft 17 are shown schematically without supports and are free to rotate on axis D1-D2.

Gear 19 is an internally toothed ring of constant radius centered on axes A1-A2 the inside part of which meshes with gear 18. Gear 19 is shown schematically without supports and can rotate on axes A1-A2. The outside surface of gear 19 is also toothed and meshes with gear 20 which is fixed to output shaft 21. Gear 20 and output shaft 21 are shown schematically without supports and are free to rotate on axis E1-E2.

Gear 23 is an internally toothed ring of constant radius centered on axes A1-A2 which meshes with gear 22. Gear 23 is shown schematically without supports and can rotate on axes A1-A2. Ring 24 is an inertia mass ring installed around toothed ring 23, centered on axes A1-A2, that can either be unclutched or clutched with gear ring 23. Ring 25 is an inertial mass ring installed around ring 24, centered on axes A1-A2, that can either be unclutched or clutched with ring 24. Ring 26 is an inertia mass ring installed around ring 25, centered on axes A1-A2, that can either be unclutched or clutched with ring 25.

The sequential position of piston 03 and gears 12, 14, 18 and 22 with their related ring gears is not meant to be in this exact order and can be modified to suit other design requirements. Also some of the components can be eliminated, refer to FIG. 3 below.

Figure 2:
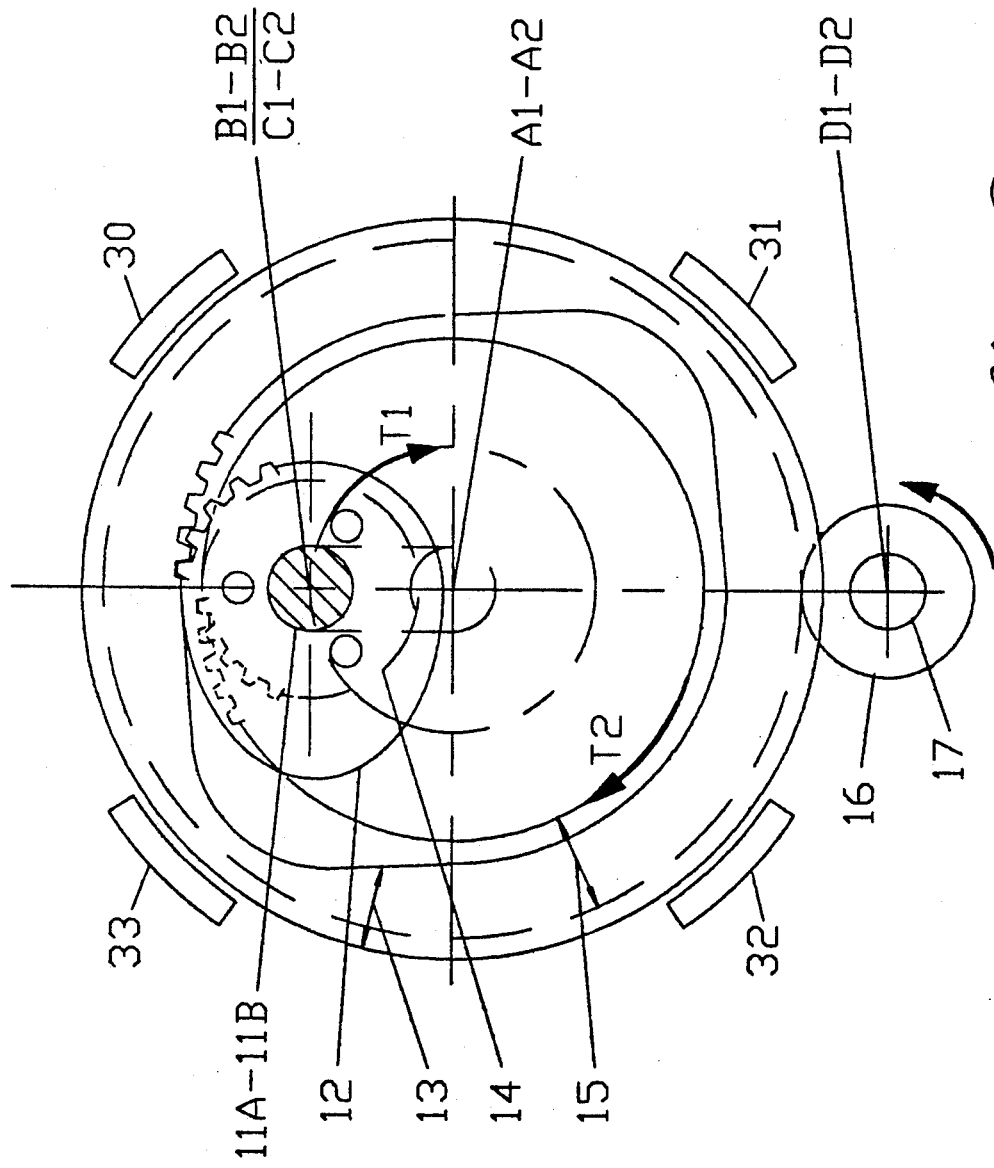
FIG. 2 is a schematic cross section f.2—f.2 from FIG. 1 with details of a preferred gear arrangement.

FIG. 2 is the cross section f.2—f.2 from FIG. 1 and the components found herein have been described in FIG. 1 hereabove. This FIG. 2 outlines a preferred embodiment for the shape of gear 12 and gear 13. In this case, the shape of gear 12 is half circular and half ellipse, the short axis of the ellipse is adjoining the diameter of the half circle and the eccentric value of the ellipse is about 0.7. The perimeter of gear 12 is half the perimeter of gear 13, which causes gear 12 to make two turns when being rotated by one turn of crankpins 11A-11B and while meshing with gear 13.

Figure 3:
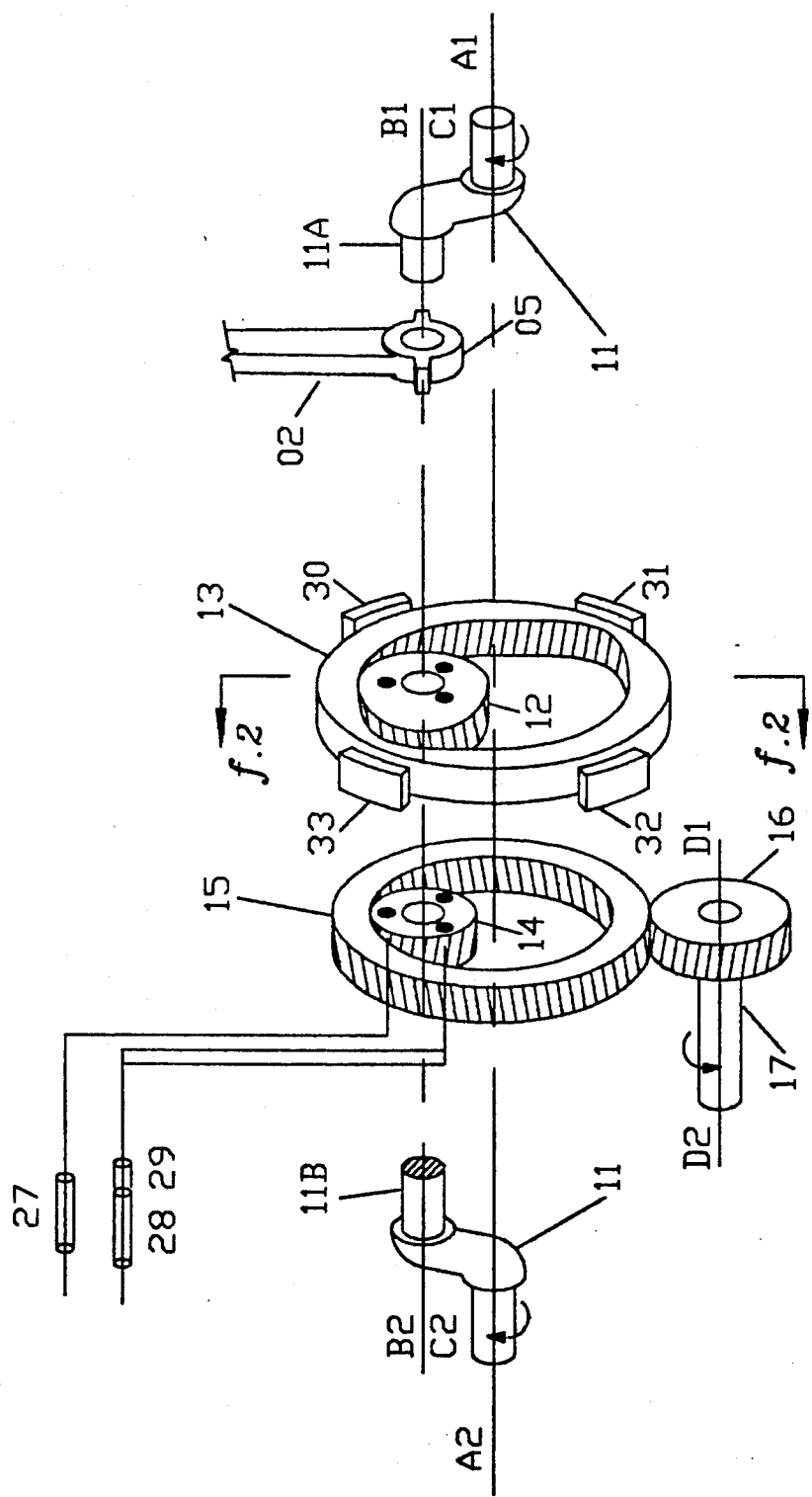
FIG. 3 is an exploded view of the crankshaft and gear arrangement of an engine embodying the basic invention with its minimum contents.

In FIG. 3 is a simplified version of the engine detailed in FIG. 1. Here, the connecting rod 02 and the bearing part 05 are rotatably connected to crankpin 11A-11B. The other parts shown in this FIG. 3 have been detailed in FIG. 1 description hereabove. The optional arrangement proposed herewith is well adapted to drive high inertia loads at low or very low horsepower, hence it is very suitable for idling purposes.

Figure 4:
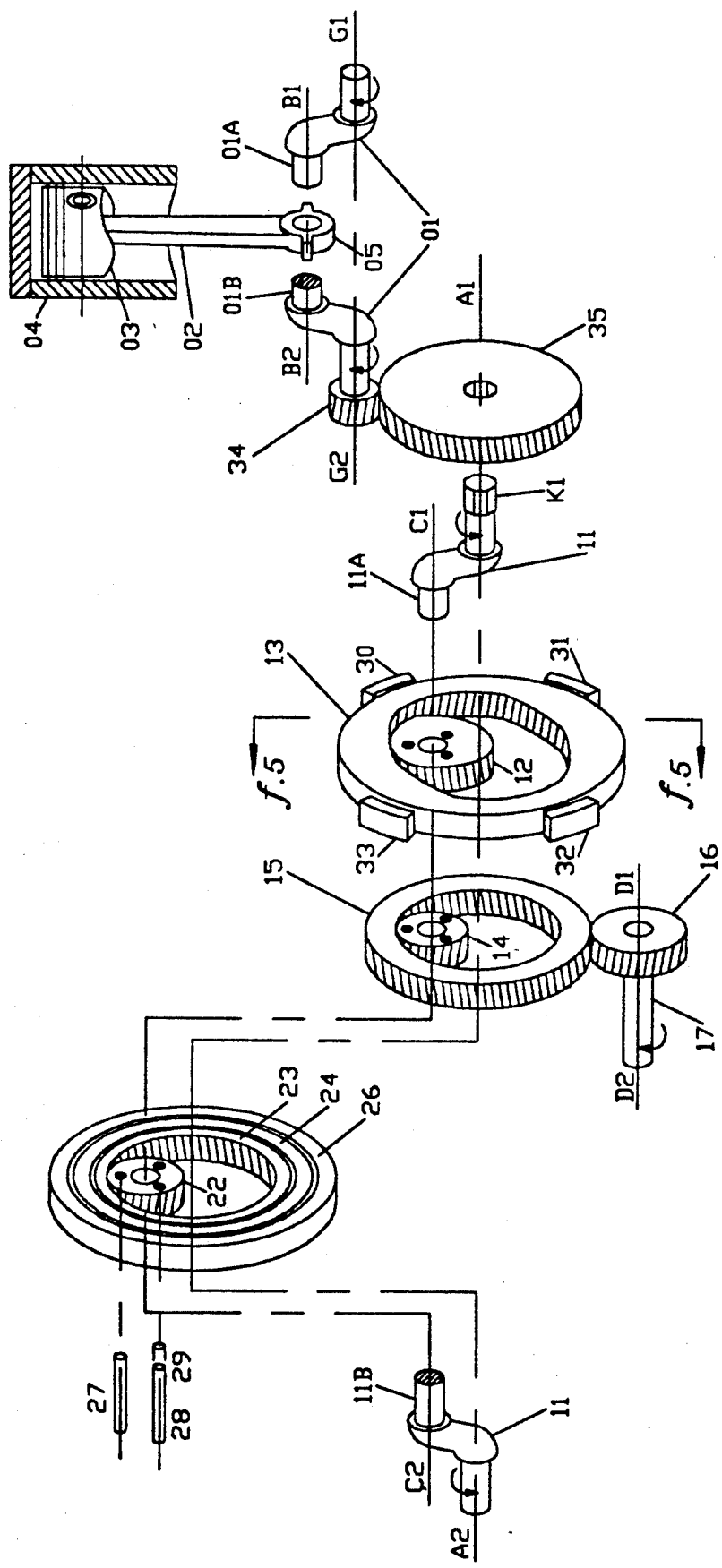
FIG. 4 is an exploded view of the piston, cylinder, crankshafts and gear arrangement of a piston engine embodying the invention through the use of speed reducing gears.

In FIG. 4 is a modified version of the engine detailed in FIG. 1. Here, crankshaft 01 is fixed to gear 34 and is rotatable around axis G1-G2. Gear 35 is centered on axis A1-A2, is fixed on crankshaft 11 through key K1 and is meshing with gear 34. Radius of gear 35 is preferably four times the radius of gear 34. The other parts of FIG. 4 have been detailed with FIG. 1 description hereabove.

Figure 5:
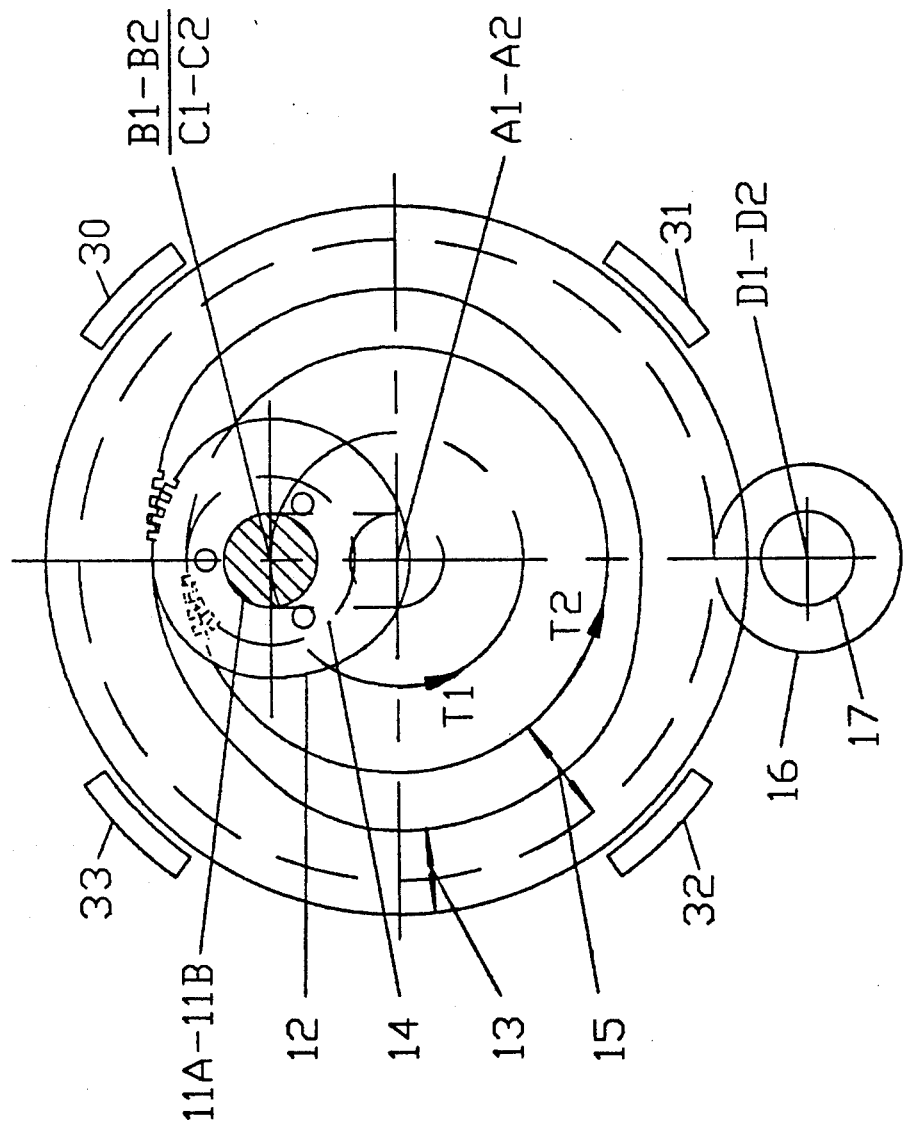
FIG. 5 is a schematic cross section f.5—f.5 from FIG. 4 with details of gear arrangement.

FIG. 5 is the cross section f.5—f.5 from FIG. 4 of which the components are described with FIG. 1 and FIG. 4 hereabove. This FIG. 5 outlines a preferred embodiment for the shape of gear 12 and gear 13. In this case, gear 12 is made up of two opposite quarter sections, each of constant but different radius, joined by other quarter sections of progressive radius. The perimeter of gear 12 is half the perimeter of gear 13, which causes gear 12 to make two turns when being rotated by one turn of crankpins 11A-11B and while meshing with gear 13.

Figure 6:
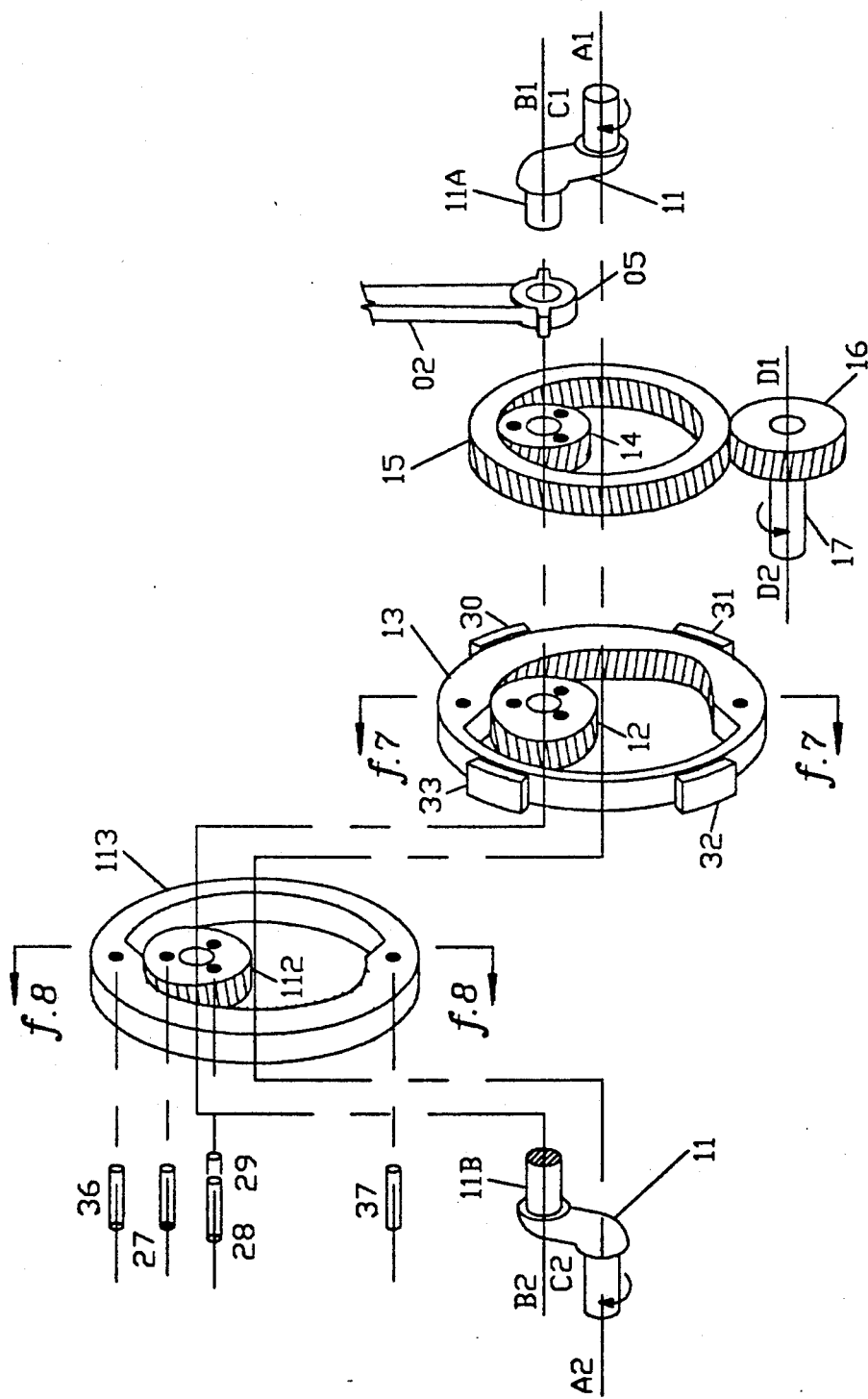
FIG. 6 is an exploded view of the crankshaft and gear arrangement of a piston engine embodying the invention with mutilated ring gears.

In FIG. 6 is a modified version of the engine shown in FIG. 3. Ring gear 13 is partly mutilated from its teeth. Gear 12 is an irregular traveling gear and meshes with gear 13 during part of its travel by crankpin 11A-11B. Ring gear 113 is partly mutilated from its teeth and is fixed to gear 112 by means of pins 36 and 37. Gear 112 is an irregular traveling gear and is fixed to gear 12 and gear 14 by means of pins 27, 28 and 29. Gear 112 is meshing with ring gear 113 during part of its travel by crankpin 11A-11B.

Figure 7:
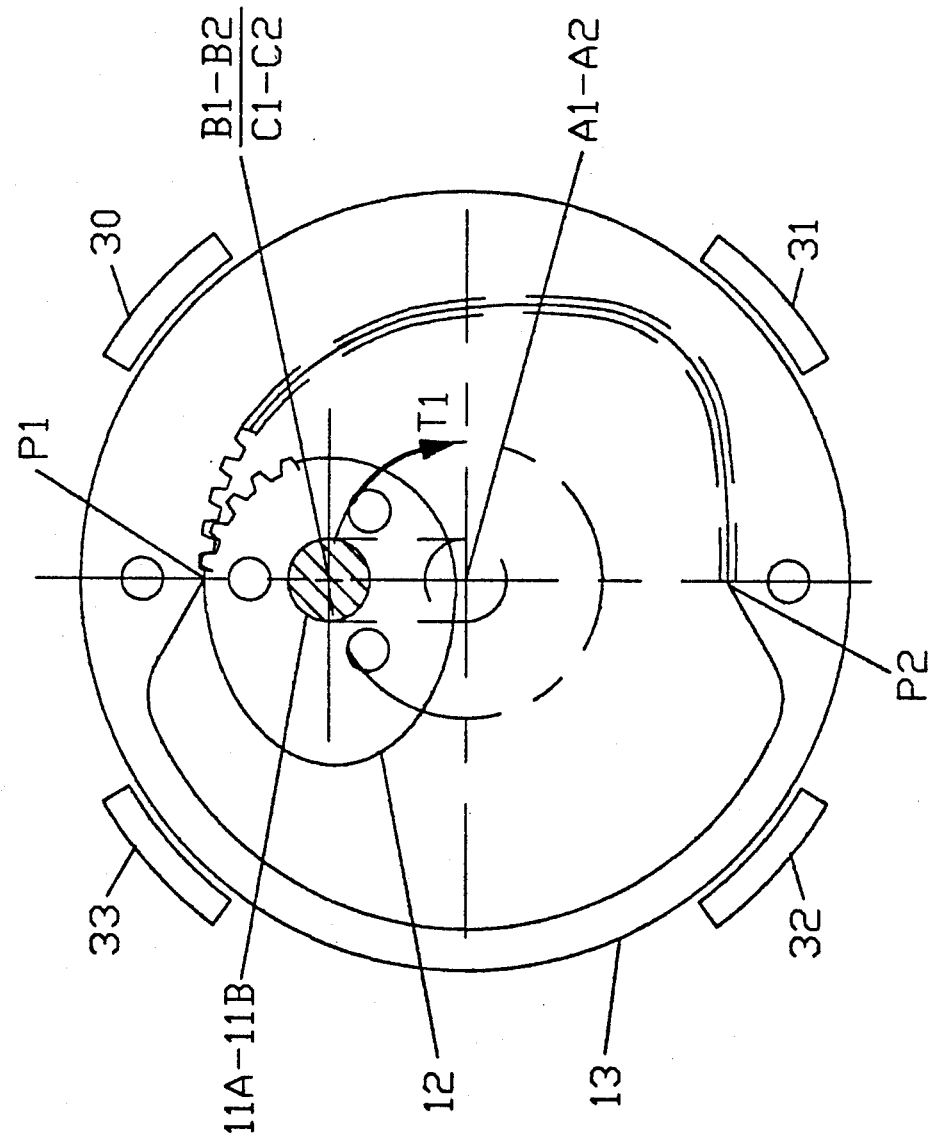
FIG. 7 is schematic cross section f.7—f.7 from FIG. 6 with details of gear arrangement.

FIG. 7 is the cross section f.7—f.7 from FIG. 6 most components of which are outlined with FIG. 6 hereabove. Gear 12 is described with FIG. 2. Gear 13 is the corresponding stationary ring gear and is mutilated from its teeth on the left hand side, so meshing between gear 12 and gear 13 can occur only when crankpin 11A-11B is on the right hand side of axis A1-A2. The perimeter of gear 12 equals the length of the toothed section of gear 13.

Figure 8:
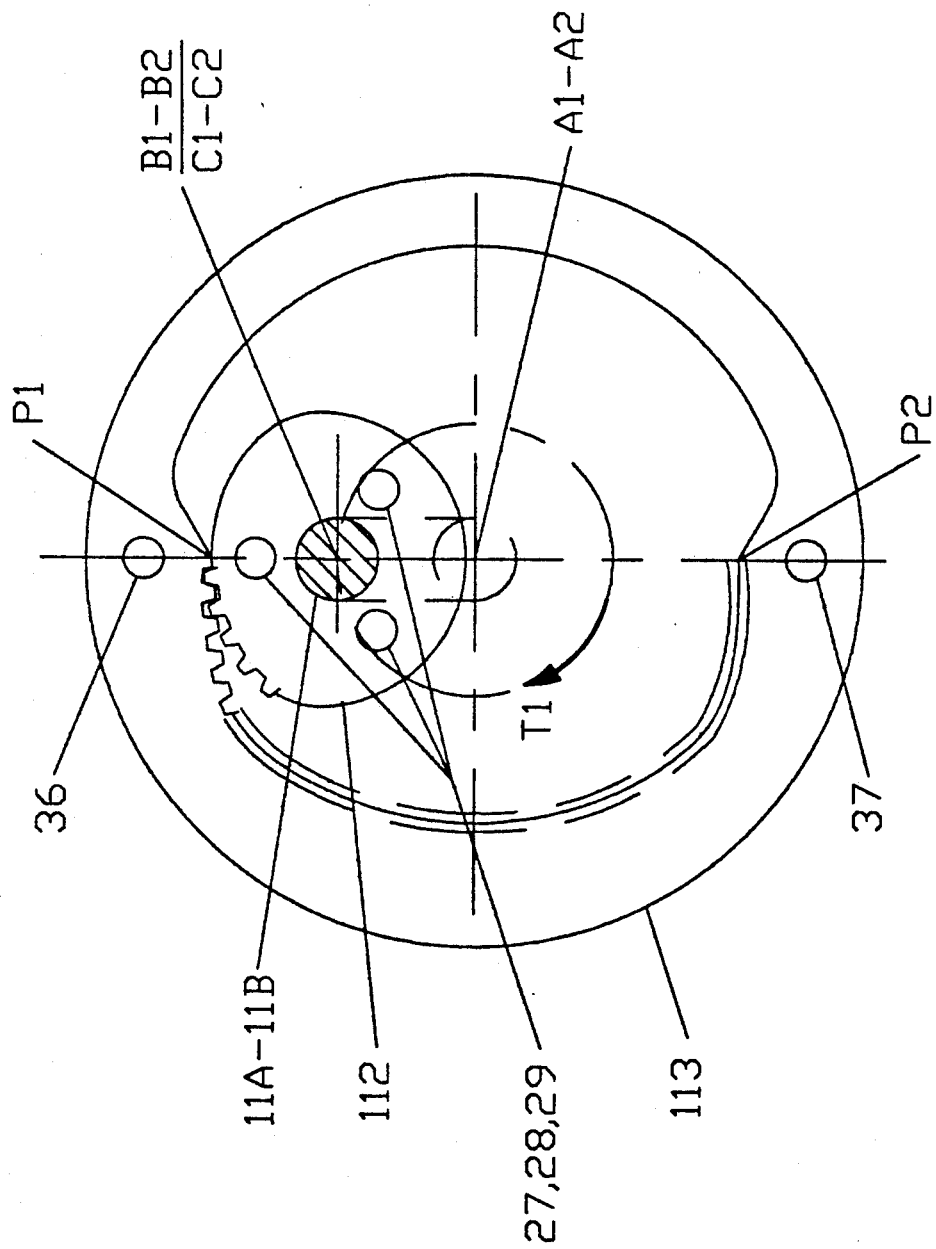
FIG. 8 is a schematic cross section f.8—f.8 from FIG. 6 with details of gear arrangement.

FIG. 8 is the cross section f.8—f.8 from FIG. 6 most components of which are outlined in FIG. 6 hereabove. FIG. 8 outlines a preferred embodiment for the shape of gear 112 and gear 113. Gear 112 is an irregular traveling gear of progressive radius change. Where gear 112 meets gear 113 at contact point P1, gear 12 also meets gear 13 at contact point P1 and the above conditions also prevail at point P2. At points P1 and P2 the radius of gear 112 equals the radius of gear 12. In this FIG. 8, the shape of gear 112 is half circular and half elliptical, the long axis of the ellipse is adjoining the diameter of the half circle and the eccentric value of the ellipse is approximately 0.7, also the perimeter of gear 112 approximately equals the perimeter of gear 12. Gear 113 is the corresponding stationary ring gear in contact with gear 112 and it is mutilated from its teeth on its right hand side, so meshing between gear gear 112 and gear 113 can occur only when crankpin 11A-11B is on the left hand side of axis A1-A2. The perimeter of gear 112 is equal to the length of the toothed section of gear 113.

Figure 9:
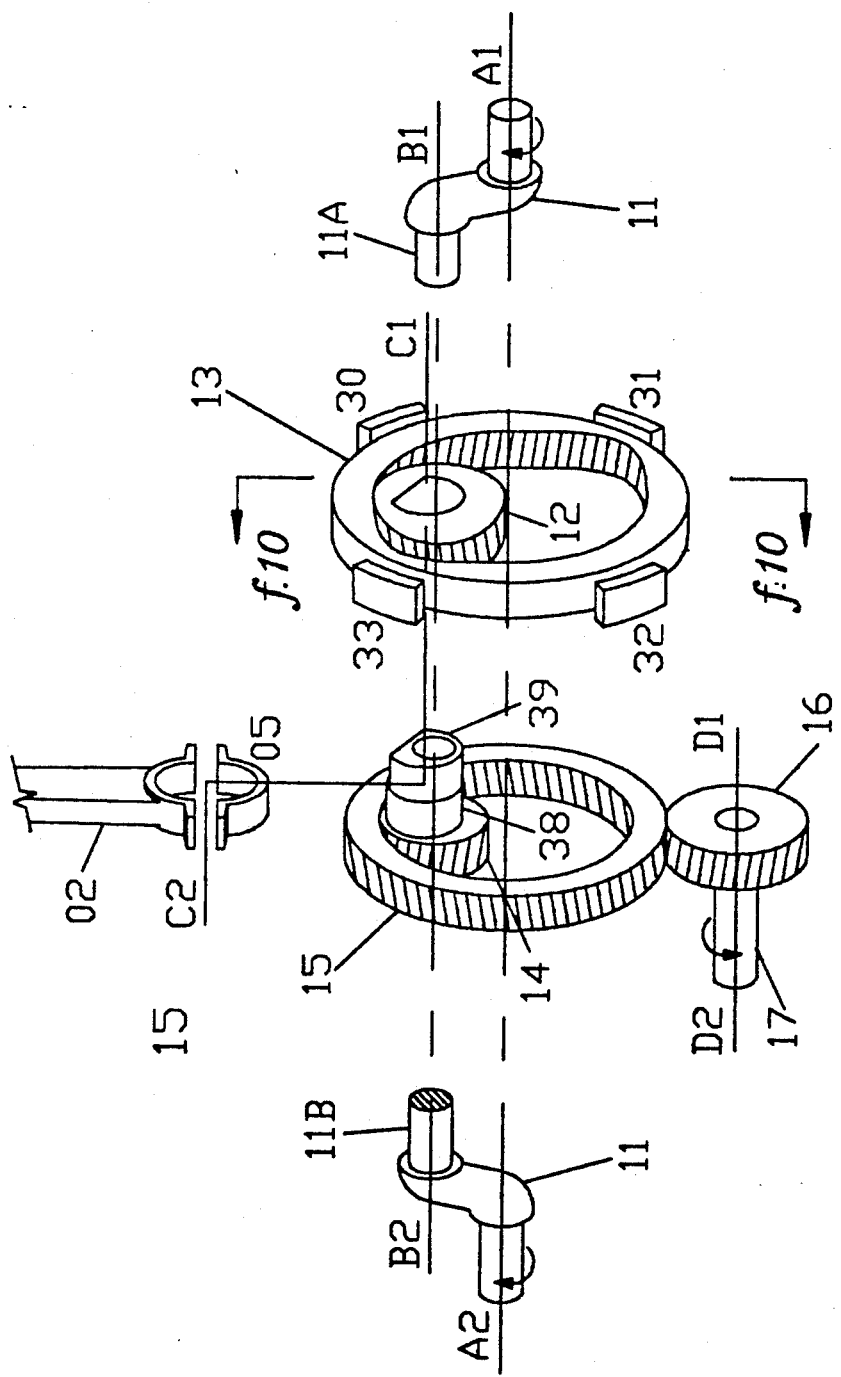
FIG. 9 is an exploded view of the crankshaft, sleeve and gear arrangement of a piston engine embodying the invention with an offsetting sleeve.

FIG. 9 shows an embodiment that combines this invention with the use of the offsetting sleeve proposed in Marchou (U.S. Pat. No. 2,088,332). FIG. 9 includes parts described hereabove with FIG. 1 except that gear 12 and gear 14 are not fixed together but separated by the offsetting sleeve 38 which is solidly fixed to gear 14. A keyed extension 39 on which gear 12 engages is fixed on the end of the offsetting sleeve 38. The rigid assembly of gear 14, sleeve 38, keyed extension 39 and gear 12 is free to rotate on crankpins 11A-11B, axis B1-B2. The connecting rod 02 and the bearing part 05 connect over the offsetting sleeve 38 in a rotatable way. The sequential arrangement of gear 14 with its related ring gear 15, of 38 with connecting rod 02, of gear 12 with its related ring gear 13, is not meant to be in this exact order and may be modified to suit.

Figure 10:
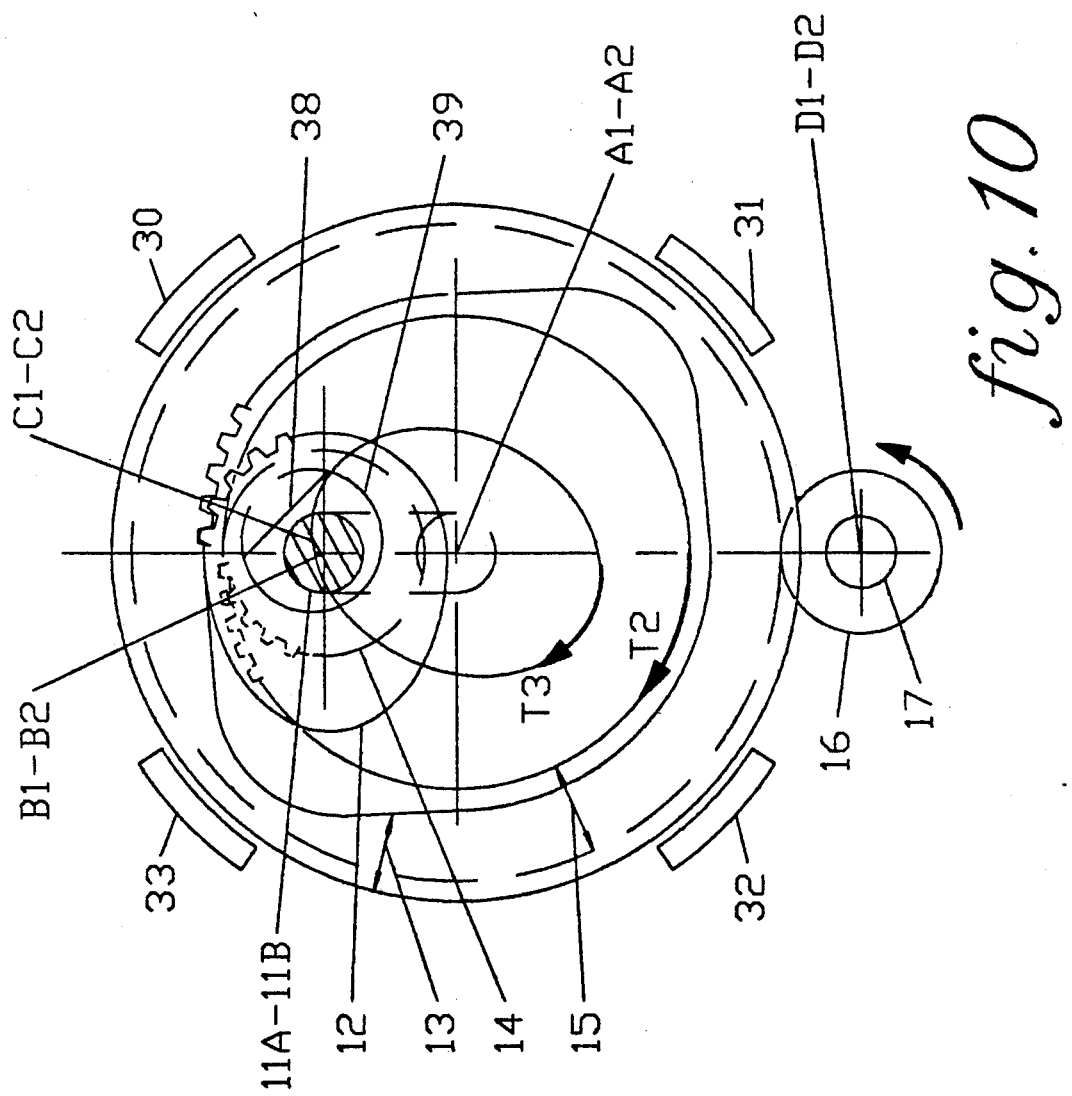
FIG. 10 is a schematic cross section f.10—f.10 from FIG. 9 with details of gear and sleeve arrangement.

FIG. 10 is the cross section f.10—f.10 from FIG. 9, the components of which have been described under FIG. 9 hereabove. FIG. 10 outlines the trajectory T3 of the offsetting sleeve center as taken from its external circumference.

FIG. 11 outlines in a very schematic way one embodiment of the invention in a multi-cylinder engine. With one of the gear arrangements as proposed hereabove in which pistons a and b are installed on crankpins which are both in line and are 180 degrees apart from the crankpin supporting the traveling gears assembly, which include traveling gear 12, traveling gear 14, and other traveling gears as selected. Optional pistons c and d are installed on the respective crankpins as pistons a and b and are 180 degrees apart from pistons a and b. The 180 degree piston arrangement is not compulsory but needs to match the recurrence of the pattern of ring gear 13. The FIG. 11 construction takes full advantage of the previously described traveling gear embodiments and will result in a mechanically well balanced engine.

Figure 12C:
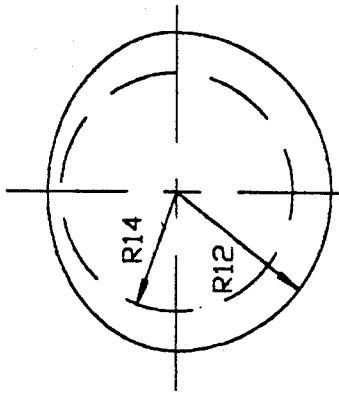
FIG. 12a through FIG. 12e show examples of the traveling gears which were used to produce the performance curves in subsequent FIGS. 13 through 23.
Figure 12F:
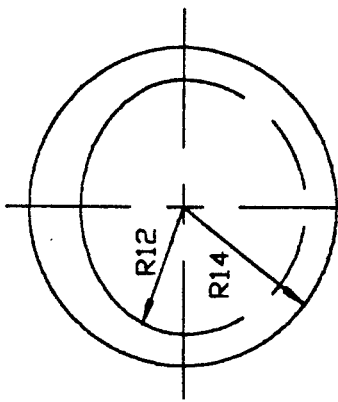
Figure 12B:
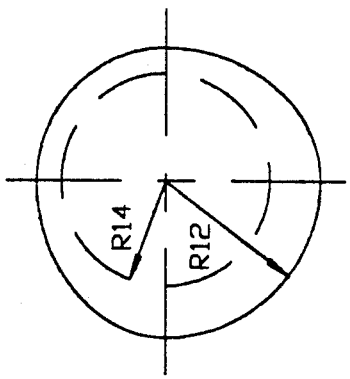
Figure 12E:
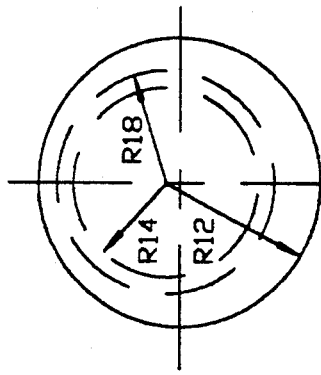

FIG. 12a, FIG. 12b, FIG. 12c, FIG. 12d and FIG. 12e are figures that show the approximate shapes of travelling gears which have been used to produce the sets of curves in FIG. 13 thru FIG. 23 herebelow. These drawings relate to the previous embodiments explained hereabove and specific values of gear radiuses have been used to calculate the graph values in the examples shown in FIG. 13 thru FIG. 23. FIG. 12e indicates gear 12 as an off-centered circle. FIG. 12f is an equivalent gear arrangement to the one in FIG. 12a wherein the irregular gear 12 is smaller than the regular traveling gears. In FIG. 12a through FIG. 12f described above, R12 refers to the radius of gear 12, R14 refers to the radius of gear 14, R18 refers to radius of gear 18, and R22 refers to the radius of gear 22.

Figure 12A:
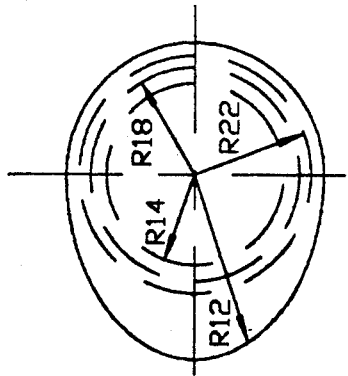
Figure 13:
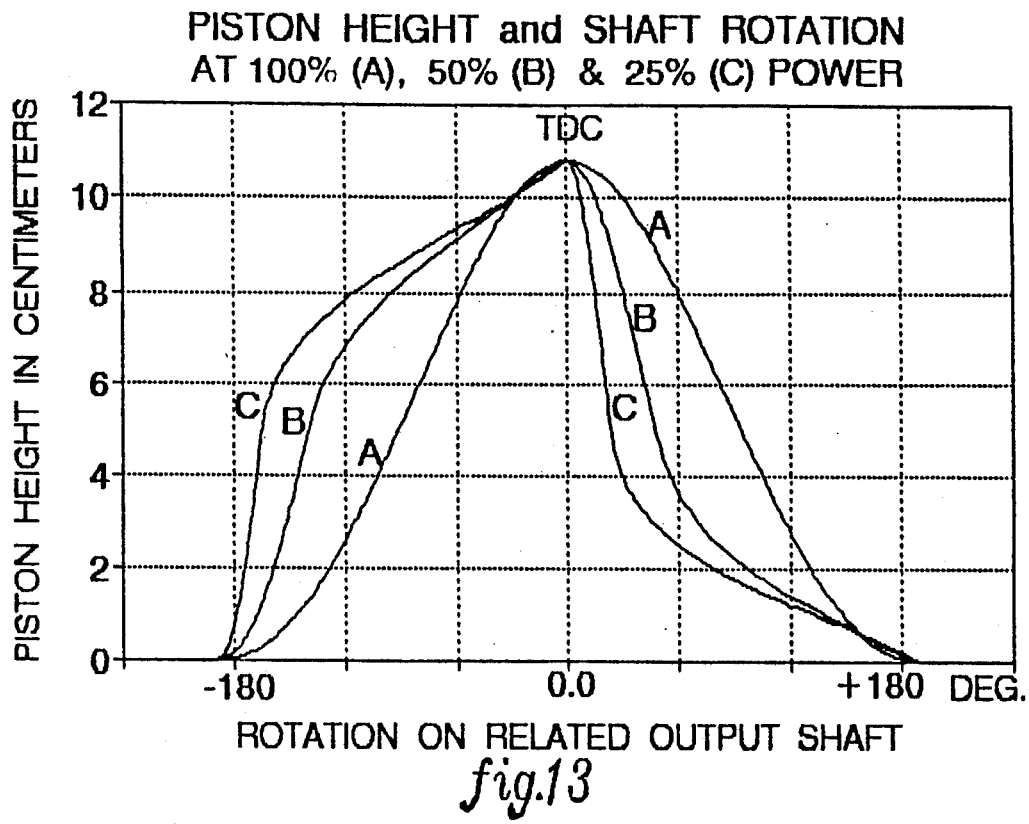
FIG. 13 through FIG. 23 are merely examples which refer to the feasibility of the invention. The values cited hereunder can be modified to some extent to attain other desirable results.

FIG. 13 refers to FIG. 1, FIG. 2, FIG. 3 and FIG. 12a with the following relevant parameters:

| | |
|---|---|
| -Minimum radius of gear 12: | 5.0 cm |
| -Maximum radius of gear 12: | 7.0 cm |
| -Radius of gear 14: | 4.65 cm |
| -Radius of gear 18: | 4.88 cm |
| -Lever of both crankpins: | 5.4 cm |
| -Length of connecting rod: | 20.5 cm |

Figure 14:
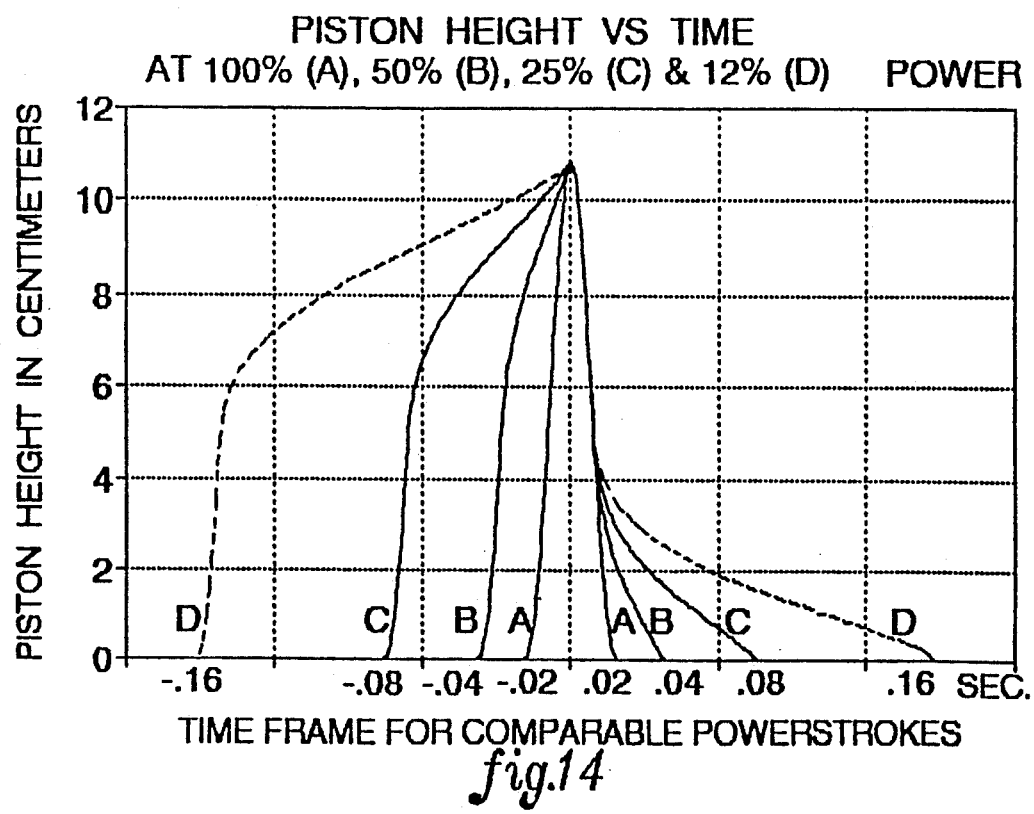

FIG. 14 refers to same data as FIG. 13 above with the addition of this parameter:

| | |
|---|---|
| -Radius of gear 22: | 4.95 cm |

Figure 15:
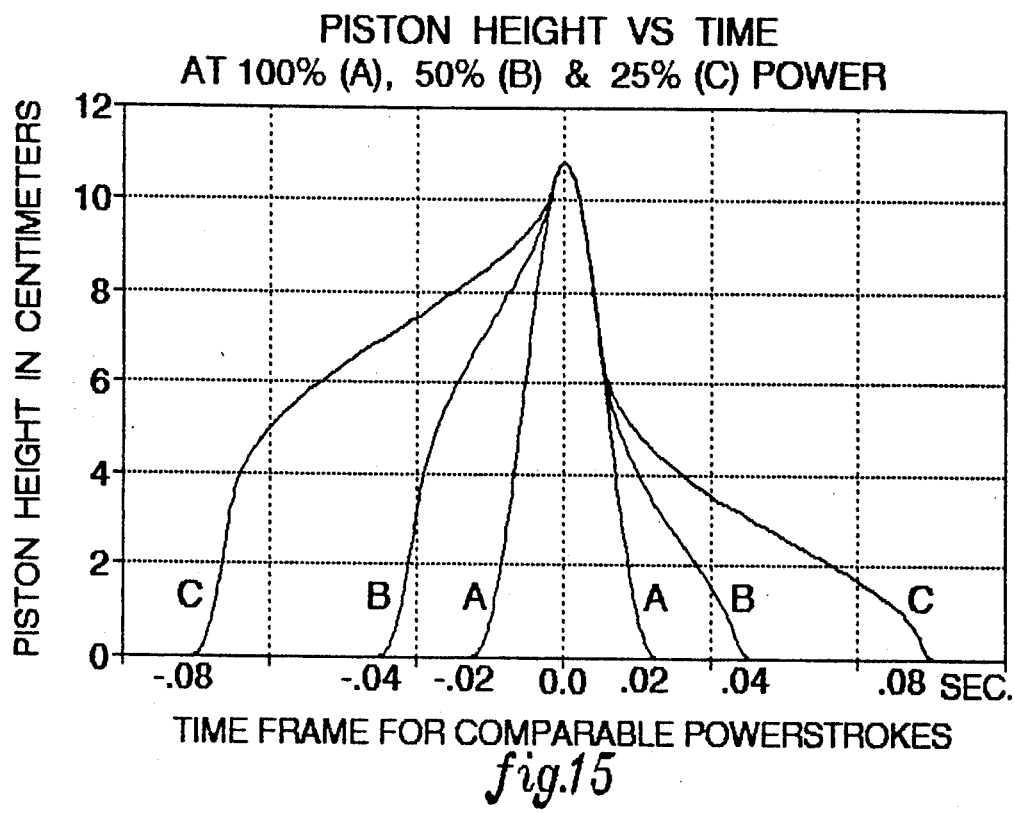

FIG. 15 refers to same data as does FIG. 13 above but with a 40 degree counter-clockwise shift in the start position of gear 12.

Figure 16:
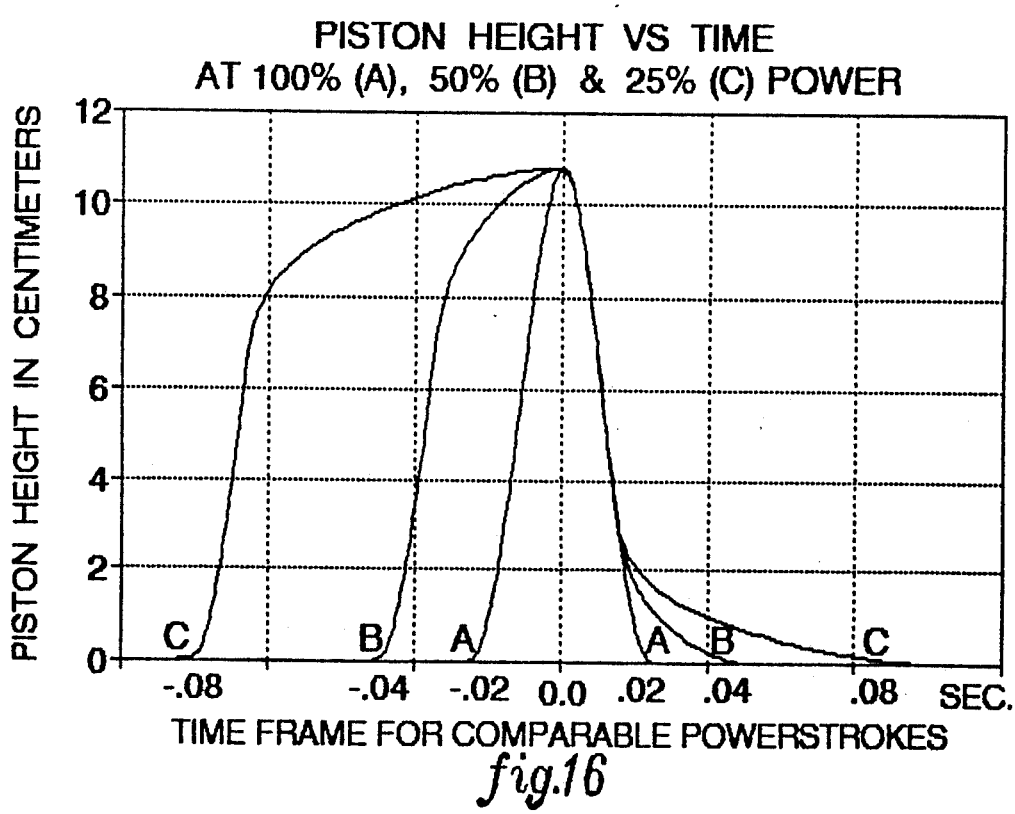

FIG. 16 refers to same data as does FIG. 13 above but with a 40 degree clockwise shift in the start position of gear 12.

Figure 17:
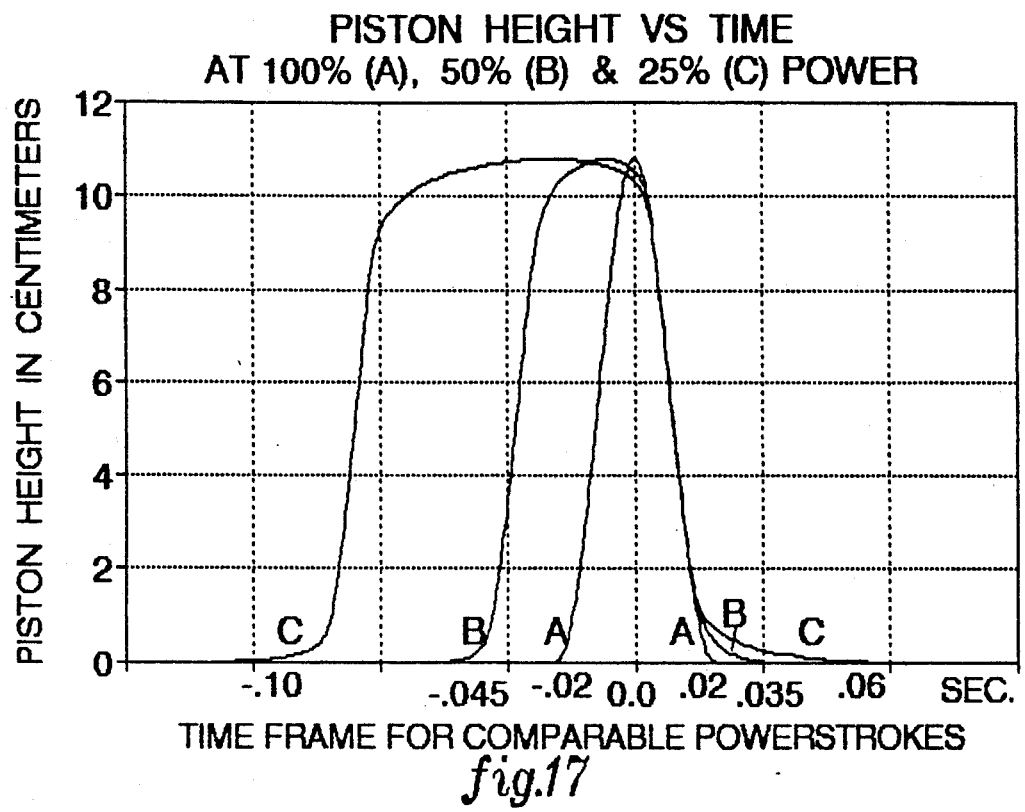

FIG. 17 refers to same data as does FIG. 13 above but with a 80 degree clockwise shift in the start position of gear 12.

Figure 18:
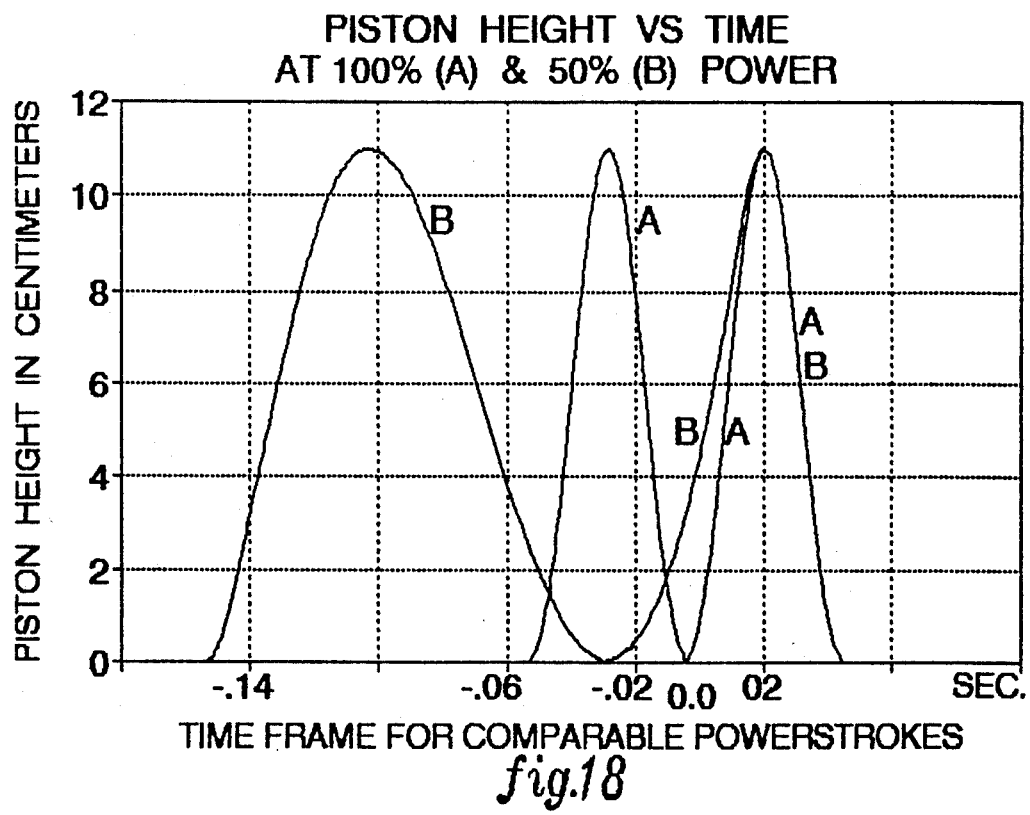

FIG. 18 refers to FIG. 4, FIG. 5 and FIG. 12b with the following relevant parameters:

| | |
|---|---|
| -Minimum radius of gear 12: | 5.0 cm |
| -Maximum radius of gear 12: | 6.0 cm |
| -Radius of gear 14: | 4.5 cm |
| -Ratio gears 34:35: | 1:4 |
| -Lever of both crankpins: | 5.47 cm |

| -Length of connecting rod: | 20.7 cm |
|---|---|

Figure 19:
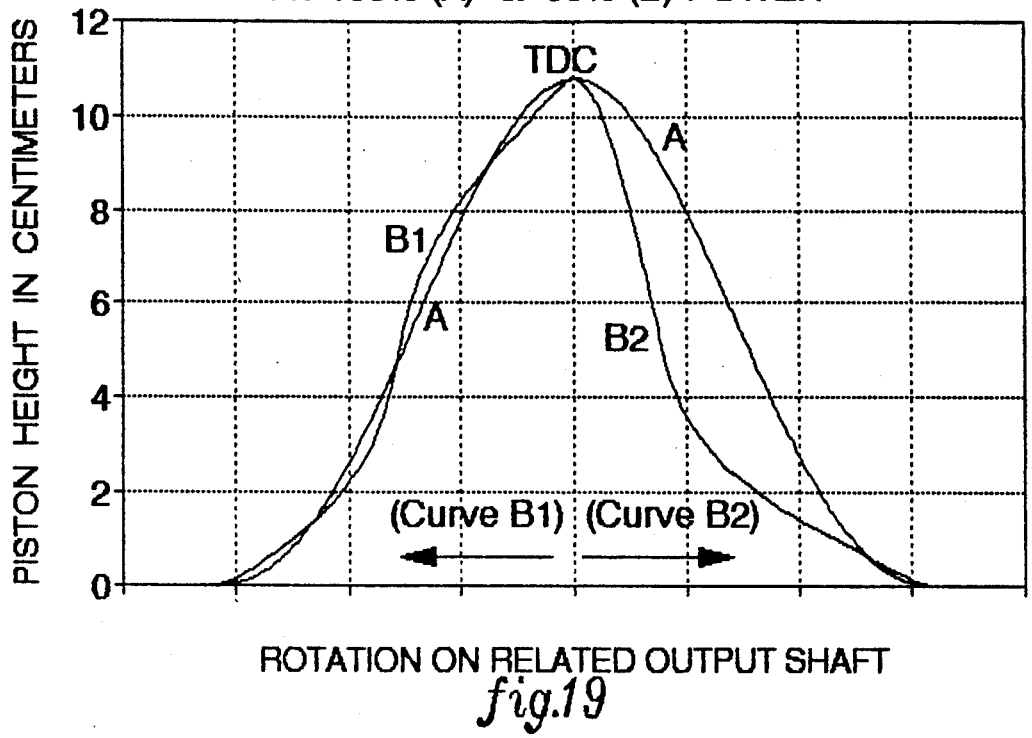

FIG. 19 refers to FIG. 6, FIG. 7, FIG. 8, with gear 12 relating to FIG. 12b and gear 112 relating to FIG. 12c. The following relevant parameters are being used:

| -Minimum radius of gear 12: | 5.0 cm |
|---|---|
| -Maximum radius of gear 12: | 7.0 cm |
| -Minimum radius of gear 112: | 5.0 cm |
| -Maximum radius of gear 112: | 5.95 cm |
| -Radius of gear 14: | 4.65 cm |
| -Lever of crankpin: | 5.4 cm |
| -Length of connecting rod: | 20.54 cm |

Figure 12D:
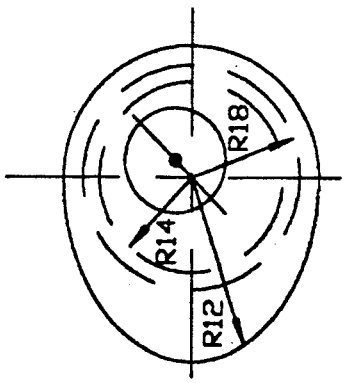
Figure 20:
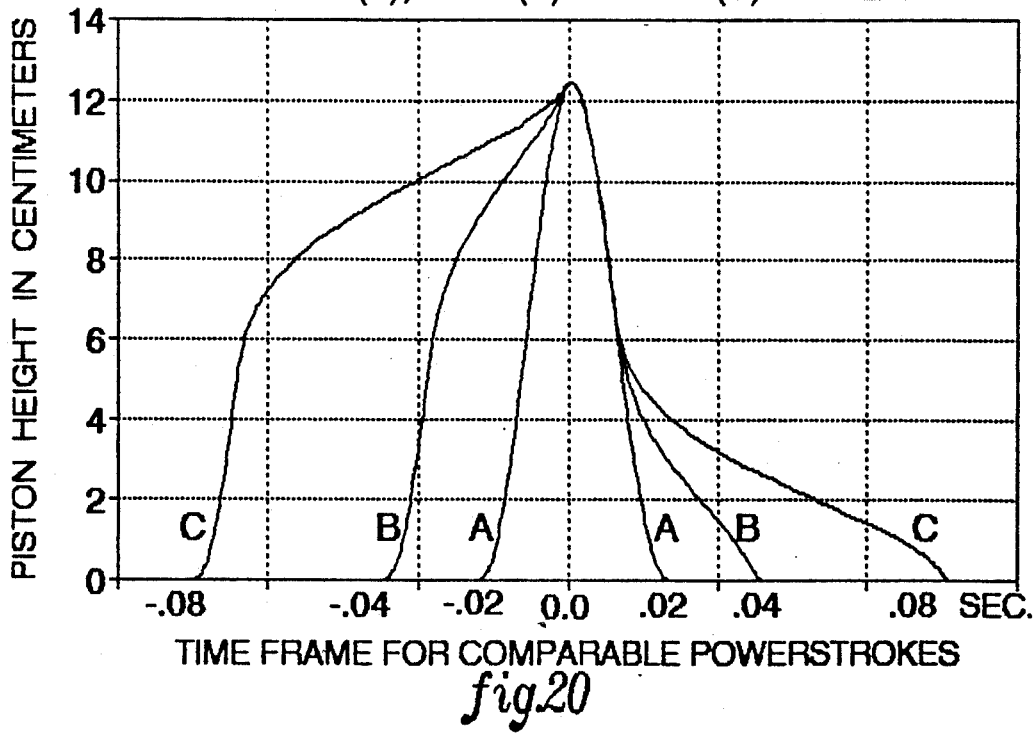

FIG. 20 refers to FIG. 9, FIG. 10 and FIG. 12d with the following relevant parameters:

| -Minimum radius of gear 12: | 5.0 cm |
|---|---|
| -Maximum radius of gear 12: | 7.0 cm |
| -Radius of gear 14: | 4.65 cm |
| -Radius of gear 18: | 4.88 cm |
| -Lever of crankpin: | 5.4 cm |
| -Length of connecting rod: | 20.71 cm |
| -Sleeve offset | 1.1 cm |

Figure 21:
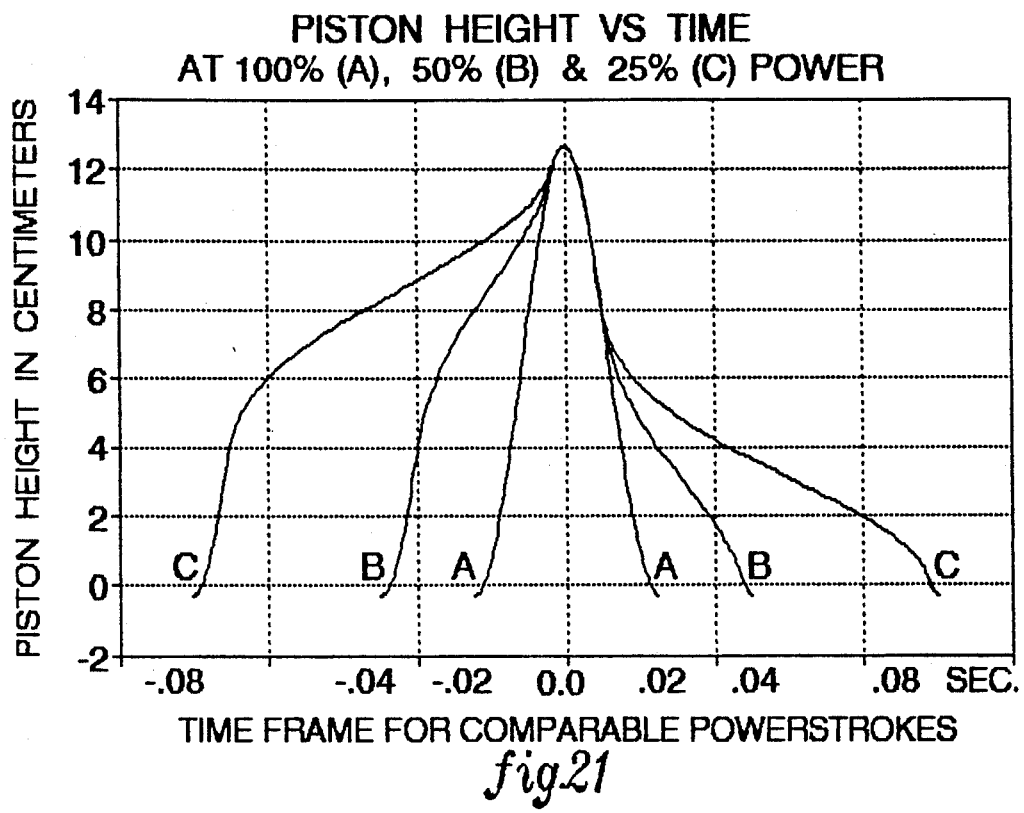

FIG. 21 refers to same data as does FIG. 20 above but with a 40 degree counter-clockwise shift in the start position of gear 12.

Figure 22:
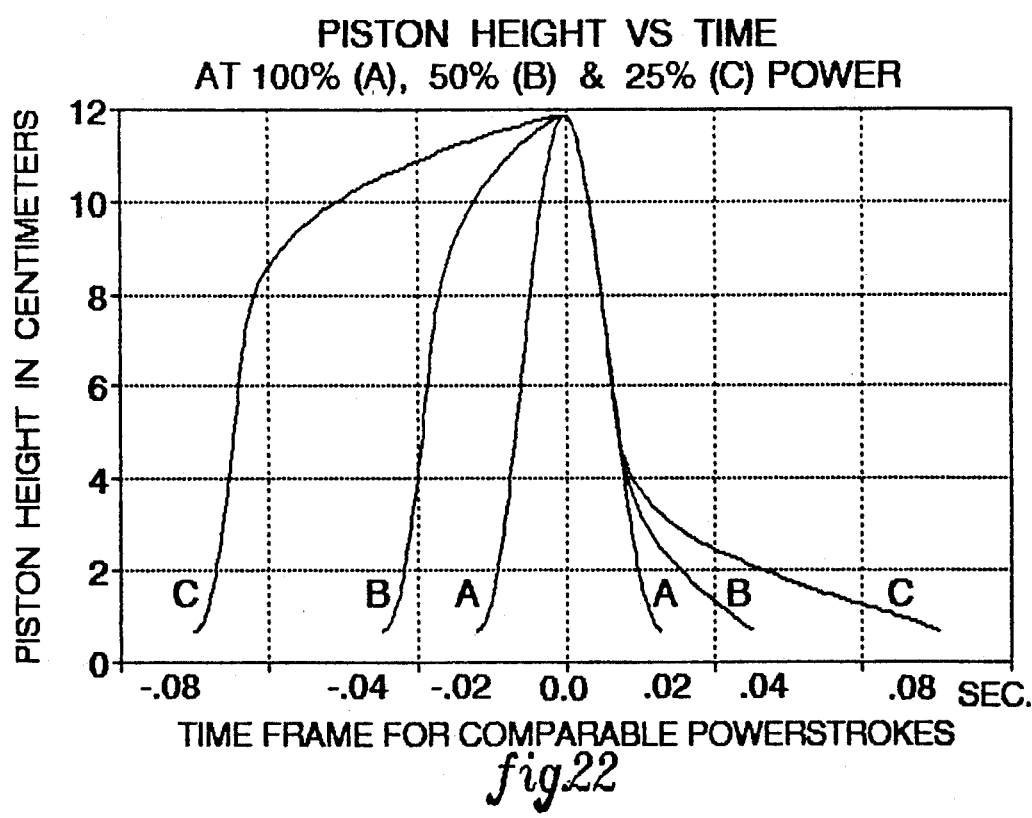

FIG. 22 refers to same data as does FIG. 20 above but with a 40 degree clockwise shift in the start position of gear 12.

Figure 23:
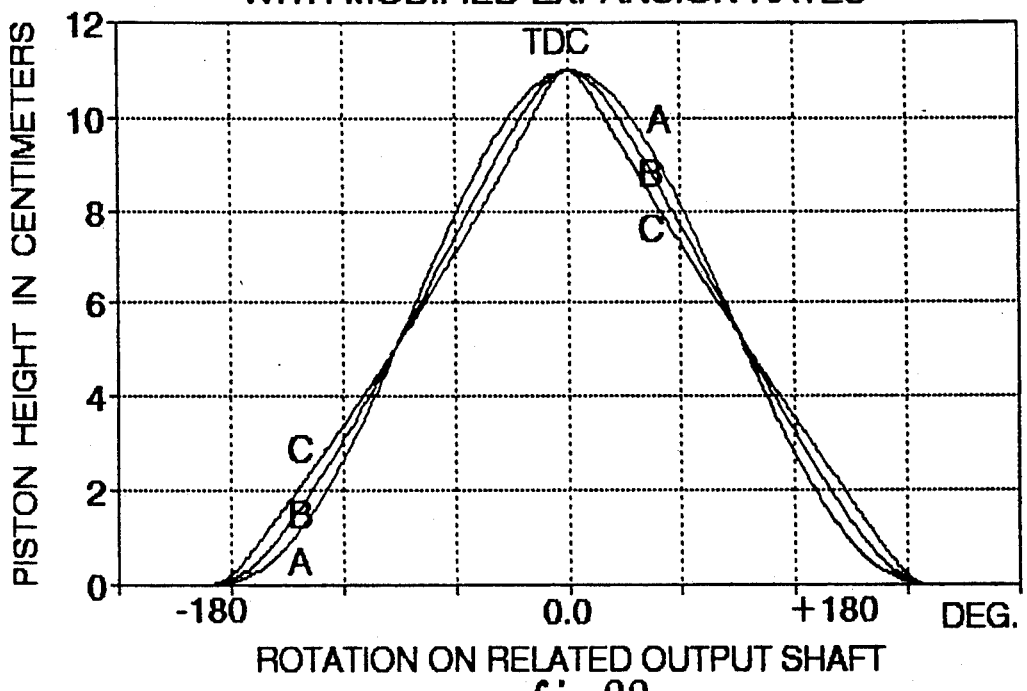

FIG. 23 refers to FIG. 1 and FIG. 12e with the following relevant parameters:

| -Minimum radius of gear 12: | 5.0 cm |
|---|---|
| -Maximum radius of gear 12: | 6.04 cm |
| -Radius of gear 14: | 4.0 cm |
| -Radius of gear 18: | 4.65 cm |
| -Lever of both crankpins: | 5.5 cm |
| -Length of connecting rod: | 20.79 cm |

Figure 24:
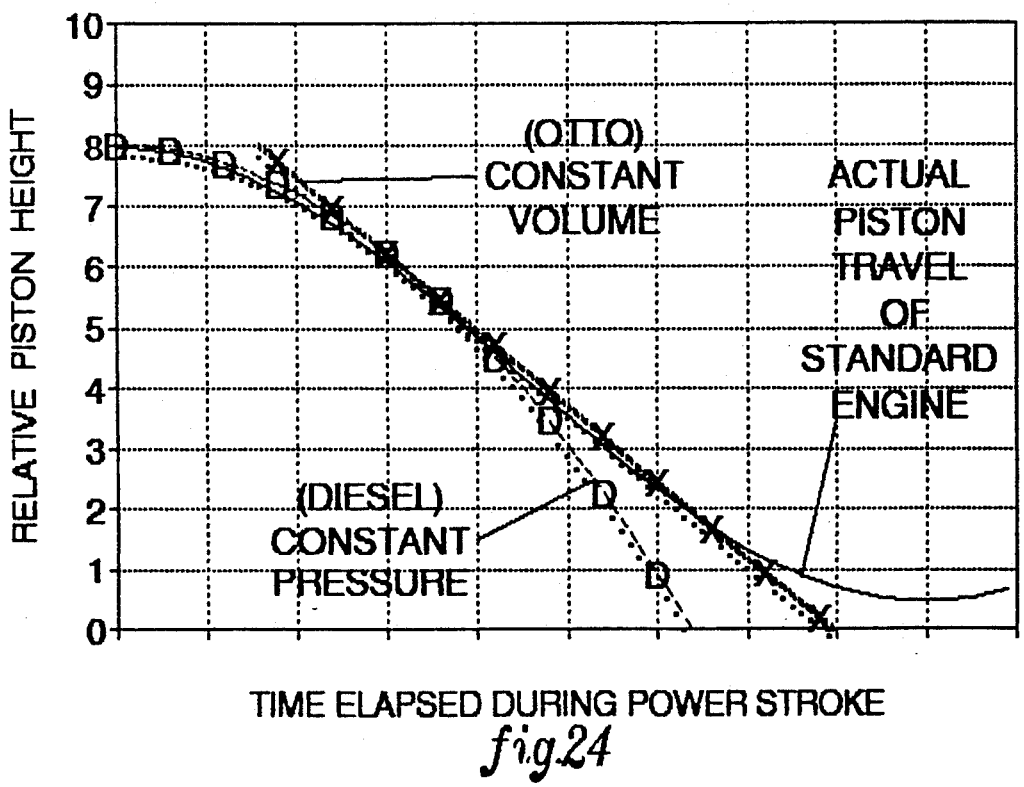
FIG. 24 is a set of curves comparing Diesel and Otto cycles with the actual piston travel of a standard engine.

FIG. 24 relates to general common data for the purpose of comparing the previous set of curves FIG. 13 thru FIG. 23 above.

OPERATION

Referring to FIG. 1 and FIG. 2, piston 03 is at its top dead center and starts to go down in cylinder 04. Connecting rod 02 goes down also and the lower part of connecting rod 02 attached with bearing part 05 initiates the rotary movement of crankpins 01A-01B. Crankshaft 01 starts to rotate and similarly crankshaft 11 starts to rotate and crankpins 11A-11B start a rotary movement from the top position. Gear 12 starts to travel and rotate against the inside surface of gear 13 which is secured into a chosen position by means of blocks 30, 31, 32, 33. Gear 14 follows the rotating movement of crankpins 11A-11B and is rotated by gear 12, thus driving gear 15 which rotates on axes A1-A2. The peripheral movement of gear 14 as it meshes with gear 15 is a function of the difference between the radius of gear 14 and the radius of gear 12 at any point of contact. Since gear 12 has a variable radius, the angular position of gear 15, driven by gear 14, is varying as it follows the rotation of crankpins 11A-11B. Finally, gear 15 drives gear 16 and output shaft 17 about axis D1-D2. As a result, the rotation of shaft 17 follows the vertical movement of piston 03 in a way which is variable and different from the rotation impressed on crankshafts 01 and 11. With the proper selection of the variable radius of gear 12, as seen in some of the embodiments proposed hereunder, very interesting positions of piston 03 versus output shaft 17 can be achieved. Shaft 17 can then be used for engine output in a non conventional way. Because of the periodical configuration of gear 12 within gear 13, the pattern of the piston 03 positions versus the angle of the output shaft 17 is similar during the upstroke as during the downstroke, however this behaviour is not of great importance. Gear 18, being of different radius than gear 14, will rotate ring gear 19 at a different rate than ring 15, though in a similar way, and produce a variable output of its own on gear 20 and on shaft 21 about axis E1-E2. The radius of gear 22 being closer to the radius of gear 12 than the radius of gear 14 and gear 18 is, gear 22 will rotate ring gear 23 with speed variations larger than those of ring 15 or ring 19. The proper selection of the radius of gear 22 along with the proper mass of the clutchable inertia mass rings 24 and 25 will ensure a uniform speed on either of the output shafts 17 or 21. If it were not for the presence of gear 22, ring gear 23, mass rings 24, 25, the inertia of the load driven shaft 17, or shaft 19, would need to be significant in order to even out the oscillations due to speed variations between either of these output shafts on one side and the crankshaft 01, crankshaft 11 with the traveling gear assembly on the other side. In addition to the masses of ring 24 and ring 25, the heavier mass of ring 26 can be clutched on the rotating assembly of gear 23, mass ring 24 and mass ring 25. Whenever the engine runs without load, the commanding speed of the piston, crankshaft and traveling gears assembly will be dictated by the inertia of the heavy mass rings assembly and this will favor a much accented speed variation in the travel of piston 03. This is of little use for the speed uniformity on any of the output shafts, however this is of great interest when running idle, because the movement of piston 03 can be slowed down drastically when it is at positions outside the main part of the power stroke. For an engine running under the above idling conditions, the presence of either gear 14 or gear 18 with their related ring gears and output shafts is almost irrelevant.

FIG. 2 shows an embodiment of gear 12 described previously and where gear 12 travels clockwise on circle T1 and where T2 is the resultant circle of rotation of gear 15. From FIG. 1 crankpin 11A-11B is coicident with crankpin 01A-01B, and as FIG. 2 indicates, this gear 12 is positioned with its smaller diameter being vertical when piston 03 is in the upper part of the downstroke, gear 15 rotation on circle T2 gradually increases respective to the rotation of crankpin 11A-11B as crankpin 11A-11B reaches the lower position of circle T1, and conversely T1 rotation decreases towards T2 rotation as crankpin 11A-11B is reaching the same lower position. When significant load inertia is connected to shaft 17 this will produce uniform speed on shaft 17, on gear 16, on gear 15 and on gear 14. This constant speed of gear 14 will cause a retarded rotation of crankpin 11A-11B when crankpin 11A-11B is coming down in the lower position. This lower crankpin 11A-11B position corresponds to the lower position of crankpin 01A-01B of crankshaft 01 which is connected to the piston connecting rod 02 which is connected to the piston 03 as referred to in FIG. 1. This results in a much slowed down piston 03 movement at the lower part of the downstroke.

FIG. 3 is a simplified embodiment of the invention which contains only the minimum critical components, the performance of which components have been previously described in FIG. 1 and FIG. 2 hereabove. Only one reduced power mode is available through alternate output shaft 17. In this case, load inertia as applied on this shaft 17 is assumed to be largely prevailing over the inertia of the rotating assembly inside the engine.

In FIG. 4 and FIG. 5, the operation is the same as in FIG. 1 except for crankshaft 11 which is rotating four times slower than crankshaft 01 and in the opposite direction, as it is driven through the meshing of gear 34 with gear 35. Also one only reduced power mode is indicated. From FIG. 4 it can be seen that one movement of crankpin 11A-11B from top position to the bottom position is related to two complete movements of crankpin 01A-01B from top-to-bottom-to-top positions. Because irregular gear 12 makes one complete revolution on itself within ring gear 13 when crankpin 11A-11B moves from top to bottom position, the relative position of output shaft 17 towards piston 03 position will be continuously changing during two complete piston travels from top-to-bottom-to-top positions and it will resume the same movement when crankpin 11A-11B moves from bottom to top position. The above arrangement is well adapted to four stroke engines. It is aimed at using the three less significant strokes of piston 03 to decelerate this same piston for the purpose of running the alternate output shaft 17 on a very efficient reduced power mode.

In FIG. 6, FIG. 7 and FIG. 8, the operation is the same as outlined in FIG. 3 except for gears 12 and 112 as explained herewith. Crankpin 11A-11B rotates clockwise from the top position down to the bottom position. Gear 12 rotates and travels against ring gear 13 from contact point P1 to contact point P2 and gear 112 matches the movement and the rotation of gear 12 without being in contact with gear 113. At the bottom position of crankpin 11A-11B, gear 12 has completed one turn within gear 13, contact point P2 between gear 12 and ring gear 13 is the same as contact point P2 between gear 112 and ring gear 113. Crankpin 11A-11B starts to move up in clockwise rotation on circle T1 and gear 112 travels against ring gear 113, up to contact point P1, and gear 12 matches the movement and the rotation of gear 112 without being in contact with gear 13. At the top position of crankpin 11A-11B, gear 112 has completed one turn within gear 113, contact point P1 between gear 112 and ring gear 113 is the same as contact point P1 between gear 12 and ring gear 13. At contact point P1 the complete sequence is resumed.

FIG. 9 and FIG. 10, the operation is similar as in FIG. 2 and FIG. 3 except for the following: offsetting sleeve 38 and keyed insert 39 rotate together with gear 12 and gear 14 when gear 12 rotates on crankpin 11A-11B and travels against the inside of ring gear 13. The periphery of sleeve 39 being out of center with the center of crankpin 11A-11B, the herewith attached connecting rod 02 and bearing part 05 will follow the elliptical course T3 caused by the rotating movement of gear 12 when it follows the movement of crankpin 11A-11B. Moreover, it can be seen that if the initial angular positioning of gear 12 and of the offsetting sleeve 38 is varied while keeping the crankpin 11 in the top position, the T3 course is shifted, thus inducing different top and bottom positions for connecting rod 02 and piston 03.

In FIG. 11, the strokes of pistons a, b, c and d are coincident or opposite and make full usage of the previously described traveling gear embodiments. Due to the arrangement of the traveling gears assembly proposed hereabove, pistons a and b are moving in unison exactly as described under these various traveling gear embodiments. Optional pistons c and d are moving in unison themselves but at 180 degrees with pistons a and b. This 180 degree opposite piston movement is matching the precited periodic rotation of gear 12 within ring gear 13 during a full rotation of 360 degrees of crankshaft 11 and the resulting movement of pistons c and d will be a replica of the movement of the pistons a and b.

In FIG. 12, the various gear shapes indicated for gear 12 are being used as examples for the calculation of the curves in the following FIG. 13 thru FIG. 23. In all examples, the indicated position of gear 12 is coincident with crankpin 11A-11B in the uppermost position.

FIG. 13 shows the feasibility of this invention, with three curves relating the position of piston 03 to the rotation of selected output shafts, from the models shown in FIG. 1, FIG. 2 and FIG. 12a. The rotation of shaft 17 is indicated in degrees, or part thereof, pending on the ratio between gear 15 and gear 16. The rotation of shaft 21 is indicated in degrees, or part thereof, pending on the ratio between gear 19 and gear 20.

| | |
|---|---|
| Curve A: | This curve is related to the full power mode and shows piston height versus rotation of crankshaft 01. |
| Curve B: | This curve is related to a first reduced power mode and shows piston height versus typical rotation of shaft 17. |
| Curve C: | This curve is related to a second reduced power mode and shows piston height versus typical rotation of shaft 21. |

FIG. 14 is a rearrangment of the data shown in previous FIG. 13, but a common time base is used to compare a similar downstroke of piston 03 when referring to a uniform speed on the related output shaft.

In addition, the engine idling mode is indicated with the dotted line of curve D. This graph outlines the delayed piston movement at the bottom of the power stroke with curves B, C and D. A common time base of 5.6 meter/sec.(1100 ft/min.) is used for average piston speed during the main part of the power stroke, however any other convenient time base can be used.

FIG. 15 is similar to FIG. 14 for curves A, B and C, except that the initial position of stationary gear 12, when referred to the position indicated on FIG. 12a, is shifted 40 degrees counter-clockwise. The comparison between FIG. 14 and FIG. 15 shows the capacity of slowing down the piston at different lower positions through the angle positioning of gear 12. This results in the modulating of the effective expansion ratio of the engine as seen on the bottom part of curves B and C.

FIG. 16 and FIG. 17 are similar to FIG. 14 for curves A, B and C, except that the initial position of stationary gear 12, when referred to the position indicated on FIG. 12a, is shifted 40 degrees clockwise and 80 degrees clockwise respectively for FIG. 16 and FIG. 17. The comparison between FIG. 14, FIG. 16 and FIG. 17 shows the capacity of slowing down the piston at different upper positions through the angle positioning of gear 12.

FIG. 18 shows the feasibility of this invention with a gear arrangement between the crankshafts 01 and 11, as shown in FIG. 4, FIG. 5 and FIG. 12b. The rotation of shaft 17 is indicated in degrees, or part thereof, pending on the ratio between gear 15 and gear 16.

| Curve A: | This curve is related to the full power mode and shows piston height versus rotation of crankshaft 01. |
| --- | --- |
| Curve B: | This curve is related to a first reduced power mode and shows piston height versus typical rotation of shaft 17. |

FIG. 19 shows the feasibility of this invention with a mutilated geared arrangement for gear 13 and gear 113, as shown in FIG. 6, FIG. 7, FIG. 8, FIG. 12a and FIG. 12c. The rotation of shaft 17 is indicated in degrees, or part thereof, pending on the ratio between gear 15 and gear 16.

| Curve A | This curve is related to the full power mode and shows piston height versus rotation of crankshaft 11. |
| --- | --- |
| Curve B: | This curve is related to a first reduced power mode and shows piston height versus typical rotation of shaft 17. |

FIG. 20, FIG. 21, and FIG. 22 show the feasibility of this invention with an offsetting sleeve around crankpin 11A-11B, as shown in FIG. 9, FIG. 10, and FIG. 12d. These set of curves are replicas of the curves shown in FIG. 14, FIG. 15 and FIG. 16 that indicate also a variation of the utmost top position of piston 03 under diverse initial positions of gear 12.

FIG. 23 shows the feasibility of this invention in regard to the improvement of piston travel versus the ideal Otto cycle. Three curves relate the position of piston 03 with the selected output shaft. The data was computed from the models shown in FIG. 1 and FIG. 12e. The shape of gear 12, as can be seen in FIG. 12e is similar to an off-center circle.

| Curve A: | This curve is related to the full power mode and shows piston height versus rotation of crankshaft 01. |
| --- | --- |
| Curve B: | This curve is related to a modified power mode and shows piston height versus typical rotation of shaft 17. |
| Curve C: | This curve is related to a modified power mode and shows piston height versus typical rotation of shaft 21. |

FIG. 24 shows the ideal piston movements in diverse thermodynamics cycles compared to the actual piston travel of present-day engines.

While the above descriptions contain many specifities these should not be construed as limitations on the scope of the invention, but rather as an exemplification of some of the embodiments thereof.

Although the invention has been described above as having a travelling irregular gear connected to the crank shaft, it is of course possible to fix the irregular ring gear to the crank shaft and to fix the inner irregular gear in one place. It is also possible to make use of elliptical gears or irregular sprockets, when a chain drive system can efficiently be used under the conditions of the engine's output.

Accordingly, the scope of the invention should be determined not by the embodiments illustrated, but by the appended claims and their legal equivalents.

I claim:

1. A variable horsepower output gearing apparatus for use with a piston engine having an output shaft and at least one piston each connected by a connecting rod to a crank, the apparatus comprising:

irregular gear means connected between the crank associated with each said at least one piston and the output shaft for varying a relationship between an angular velocity of the crank and an angular velocity of the output shaft, the relationship between the angular velocity of the crank during a power stroke phase of the piston's cycle and the output shaft being such that a rate of volume expansion of a cylinder associated with the piston is conducive to efficient combustion in said volume, said irregular gear means providing at least two power output connections between said crank associated with each said at least one piston and the output shaft, said power output connections having different said relationships; and gear switching means for selecting one of said at least two power output connections, whereby by selecting said power output connection, said relationship can be selected to best suit the desired horsepower output of the engine.

2. A variable horsepower output gearing apparatus for use with a piston engine having an output shaft and at least one piston each connected by a connecting rod to a crank, the apparatus comprising:

irregular gear means connected between the crank associated with each said at least one piston and the output shaft for varying a relationship between an angular velocity of the crank and an angular velocity of the output shaft, the relationship between the angular velocity of the crank during a power stroke phase of the piston's cycle and the output shaft being such that a rate of volume expansion of a cylinder associated with the piston is conducive to efficient combustion in said volume, said irregular gear means comprising an irregular travelling gear rotatably mounted on a crank lever connected to said crank, the irregular travelling gear being meshed with a complementary stationary ring gear, and a regular travelling gear coupled to said irregular travelling gear and meshed with a regular ring gear, said regular ring gear being coupled to said output shaft.

3. Apparatus as claimed in claim 1, wherein said irregular gear means comprise an irregular travelling gear rotatably mounted on a crank lever connected to said crank, the irregular travelling gear being meshed with a complementary stationary ring gear, and a regular travelling gear coupled to said irregular travelling gear and meshed with a regular ring gear, said regular ring gear being coupled to said output shaft.

4. Apparatus as claimed in claim 1, wherein said gear switching means select between a direct connection from said crank to said output shaft and said irregular gear means.

5. Apparatus as claimed in claim 3, further comprising a plurality of regular travelling gears meshed with a plurality of corresponding regular ring gears, said regular travelling gears being of different radii to provide said different relationships, and wherein said gear switching means selectively connect one of said plurality of regular ring gears to said output shaft.

6. Apparatus as claimed in claim 5, wherein said gear switching means select between a direct connection from said crank to said output shaft and said irregular gear means.

7. Appratus as claimed in claim 1, further comprising an additional power output connection that is not connected to said output shaft, and clutchable inertial mass means for engaging or disengaging additional inertial mass with said additional power output connection, said additional power output connection providing said relationship which is more accentuated than said relationships of said at least two power output connections, whereby when an inertial mass of said piston and said crank is greater than an inertial mass of said output shaft connected to a load, the inertial mass means can be engaged to make the inertial mass on said output shaft greater than the inertial mass of said piston and said crank.

8. Appratus as claimed in claim 2, further comprising an additional power output connection that is not connected to said output shaft, and clutchable inertial mass means for engaging or disengaging additional inertial mass with said additional power output connection, said additional power output connection providing said relationship which is more accentuated than said relationships of said at least two power output connections, whereby when an inertial mass of said piston and said crank is greater than an inertial mass of said output shaft connected to a load, the inertial mass means can be engaged to make the inertial mass on said output shaft greater than the inertial mass of said piston and said crank.

9. Apparatus as claimed in claim 2, wherein said crank lever is connected to said crank by gear reduction means providing a quarter turn on said crank lever for every turn of said crank.

10. Apparatus as claimed in claim 3, wherein said crank lever is connected to said crank by gear reduction means providing a quarter turn on said crank lever for every turn of said crank.

11. Apparatus as claimed in claim 2, wherein said stationary ring gear comprises first and second mutilated half ring gears, the first half ring gear for meshing with said irregular travelling gear for one half turn of said crank, said irregular gear means further comprising another travelling gear solid with said irregular travelling gear for meshing with the second half ring gear for another half turn of said crank, a transition between the first half ring gear being in engagement during said half turn and the second half ring gear being in engagement during said other half turn and vice versa being smooth, whereby when said irregular travelling gear is meshed with the first half ring gear, said relationship is varied, and when said other travelling gear meshes with the second half ring gear, said relationship is substantially constant.

12. Apparatus as claimed in claim 3, wherein said stationary ring gear comprises first and second mutilated half ring gears, the first half ring gear for meshing with said irregular travelling gear for one half turn of said crank, said irregular gear means further comprising another travelling gear solid with said irregular travelling gear for meshing with the second half ring gear for another half turn of said crank, a transition between the first half ring gear being in engagement during said half turn and the second half ring gear being in engagement during said other half turn and vice versa being smooth, whereby when said irregular travelling gear is meshed with the first half ring gear, said relationship is varied, and when said other travelling gear meshes with the second half ring gear, said relationship is substantially constant.

13. Apparatus as claimed in claim 12, wherein said gear switching means select between a direct connection from said crank to said output shaft and said irregular gear means.

14. Apparatus as claimed in claim 2, wherein said stationary ring gear is adjustable in angular position in order to set where in said power stroke said relationship is to be varied.

15. Apparatus as claimed in claim 3, wherein said stationary ring gear is adjustable in angular position in order to set where in said power stroke said relationship is to be varied.

16. Apparatus as claimed in claim 2, wherein said connecting rod is directly connected to said irregular travelling gear at a pivot axis which is offset, in order to provide a substantially elliptical lower connecting rod travel path, and said stationary gear is adjustable in angular position in order to set where in said power stroke said relationship is to be varied, and to change a compression ratio in said cylinder.

17. Apparatus as claimed in claim 3, wherein said connecting rod is directly connected to said irregular travelling gear at a pivot axis which is offset, in order to provide a substantially elliptical lower connecting rod travel path, said stationary gear is adjustable in angular position in order to set where in said power stroke said relationship is to be varied, and to change a compression ratio in said cylinder.

18. Apparatus as claimed in claim 2, wherein said irregular travelling gear comprises a first section of its surface having a constant radius and a second section having a progressively changing radius, whereby an almost regular sinewave relation between said piston and said output shaft during most of said downstroke is provided, followed by a retarded piston movement during a remaining portion of said cycle.

19. Apparatus as claimed in claim 3, wherein said irregular travelling gear comprises a first section of its surface having a constant radius and a second section having a progressively changing radius, whereby an almost regular sinewave relation between said piston and said output shaft during most of said downstroke is provided, followed by a retarded piston movement during a remaining portion of said cycle.

* * * * *

UNITED STATES PATENT AND TRADEMARK OFFICE
CERTIFICATE OF CORRECTION

PATENT NO. : 5,170,757

DATED : December 15, 1992

INVENTOR(S) : Damien GAMACHE

It is certified that error appears in the above-identified patent and that said Letters Patent is hereby corrected as shown below:

In column 5:
- line 63, replace "$B_1B_2$" by --$C_1$-$C_2$--;

In column 7:
- line 10, replace "the perimeter" by --the inner contour--;
- line 19, replace "112" first occurrence by --13--;
- line 38, insert --of Figure 7-- after "gear 12";
- line 41, insert --of Figure 7-- after "gear 12";
- line 49, delete "gear" second occurrence;

In column 8:
- line 14, replace "as" by --of--;

In column 10:
- line 38, delete "of little use for the speed";
- delete line 39 in its entirety;

In column 11:
- line 49, replace "At" by --Between the bottom and--;
- line 60, replace "39" by --38--;

In column 14:
- line 19, replace "two" by --one second--;
- line 20, replace "connections" by --connection--;
- line 21, delete the comma after "shaft";
- delete line 22 in its entirety;
- line 23, delete "said relationships";
- line 24, replace "one of" by --between--;
- line 25, replace "two" and "connections" by --one second-- and --connection and the crank--, respectively;
- line 26, replace "said power output connection" by --between said at least one second power output connection and the crank--;

In column 15:
- line 7, replace "Appratus" by --Apparatus--;

UNITED STATES PATENT AND TRADEMARK OFFICE
CERTIFICATE OF CORRECTION

PATENT NO. : 5,170,757

DATED : December 15, 1992

INVENTOR(S) : Damien GAMACHE

It is certified that error appears in the above-identified patent and that said Letters Patent is hereby corrected as shown below: In column 15:

- line 13, replace "said relationships" by --said relationship--;
- line 14, replace "two" and "connections" by --one-- and --connection--, respectively;
- line 15, delete "when an inertial mass of said piston and said";
- delete lines 16 to 19 in their entirety;
- line 20, replace "crank." by --the inertial mass of the crank with the irregular gear means is counterbalanced for the purpose of maintaining a substantially constant speed on said output shaft.--;
- line 21, replace "Appratus" by --Apparatus--;
- line 22, insert --connected to said engine-- after "connection";
- line 25, replace "additional power output connection, said" by: --regular ring gear,--;
- delete lines 26 to 33 in their entirety; and
- line 34, delete "crank." and replace with --whereby the output shaft is an idle shaft, and the inertial mass of the crank with the irregular gear means is counterbalanced for the purpose of maintaining a substantially constant speed on said output shaft during idle when said inertial mass means are engaged.--

Signed and Sealed this

Twenty-fifth Day of January, 1994

Attest:

BRUCE LEHMAN

Attesting Officer

Commissioner of Patents and Trademarks